(12) United States Patent
Noh et al.

(10) Patent No.: US 8,498,038 B2
(45) Date of Patent: Jul. 30, 2013

(54) ELECTROCHROMIC DEVICE

(75) Inventors: Chang Ho Noh, Suwon-si (KR);
Rupasree Ragini Das, Suwon-si (KR);
Jung Woo Kim, Hwaseong-si (KR);
Seog Jin Jeon, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 13/396,247

(22) Filed: Feb. 14, 2012

(65) Prior Publication Data
US 2013/0033735 A1    Feb. 7, 2013

(30) Foreign Application Priority Data

Aug. 5, 2011   (KR) .................. 10-2011-0078116

(51) Int. Cl.
*G02F 1/153*   (2006.01)

(52) U.S. Cl.
USPC ........................................... 359/273

(58) Field of Classification Search
USPC ........................................... 359/273
See application file for complete search history.

(56) References Cited

U.S. PATENT DOCUMENTS

| | | | |
|---|---|---|---|
| 5,875,012 | A | 2/1999 | Crawford et al. |
| 7,061,559 | B2 | 6/2006 | Khan et al. |
| 8,031,133 | B2 | 10/2011 | Gally et al. |
| 2006/0256421 | A1 | 11/2006 | Schoellmann et al. |
| 2007/0171345 | A1 | 7/2007 | Shin |
| 2008/0198114 | A1 | 8/2008 | Roberts et al. |
| 2009/0161195 | A1* | 6/2009 | Jang et al. ............ 359/265 |
| 2011/0114981 | A1 | 5/2011 | Higaki et al. |
| 2011/0279884 | A1 | 11/2011 | Fujimura et al. |

FOREIGN PATENT DOCUMENTS

| | | |
|---|---|---|
| JP | 2006-524360 A | 10/2006 |
| JP | 2008-032911 | 2/2008 |
| JP | 2010-103472 A | 5/2010 |
| KR | 20070069722 A | 7/2007 |
| KR | 2009-0108085 A | 10/2009 |
| WO | WO-9953373 A1 | 10/1999 |

OTHER PUBLICATIONS

European Search Report dated Dec. 5, 2012 corresponding to Application No. 12172374.6.
Mortimer R J et al.; "Electrochromic organic and polymeric materials for display applications", Displays Devices, Dempa Publications, Tokyo, Japan, Jan. 1, 2006, pp. 2-18.
Nakashima, Michiya. "Bismuth Electrochromic Device with High Paper-Like Quality and High Performances." 2010, 2(5), pp. 1471-1482.

* cited by examiner

*Primary Examiner* — Joseph P Martinez
(74) *Attorney, Agent, or Firm* — Harness, Dickey & Pierce, P.L.C.

(57) ABSTRACT

According to example embodiments, an electrochromic device includes pixel containing a first sub-pixel and a second sub-pixel. The first sub-pixel includes a first electrolyte contacting a first electrochromic layer. The first electrochromic layer includes a first electrochromic material configured to display each one of transparency and at least two colors, based on a voltage applied to the first electrochromic material. The second sub-pixel includes a second electrolyte contacting a second electrochromic layer. The second electrochromic layer includes a second electrochromic material configured to display each one of transparency, black, and at least one color other than black, based on a voltage applied to the second electrochromic material.

41 Claims, 12 Drawing Sheets
(2 of 12 Drawing Sheet(s) Filed in Color)

US 8,498,038 B2

ELECTROCHROMIC DEVICE

CROSS-REFERENCE TO RELATED APPLICATION

This application claims priority under 35 U.S.C. §119 to Korean Patent Application No. 10-2011-0078116, filed in the Korean Intellectual Property Office on Aug. 5, 2011, the entire contents of which are incorporated herein by reference.

BACKGROUND

1. Field

Example embodiments relate to an electrochromic device.

2. Description of the Related Art

Electrochromism is a phenomenon in which applying a voltage causes some materials to reversibly change their color according to an electric field direction. An electrochromic material is a material that is capable of reversibly changing its light characteristics by electrochemical oxidation and reduction. In other words, some electrochromic materials may not display color when they are not subjected to an applied electric field and may display color when they are subjected to an applied electric field; or otherwise, some electrochromic materials may display color when they are not subject to an applied electric field and they may not display color or may change color when subjected to an applied electric field.

Electrochromic materials may be applied to electrochromic devices in which the light transmittance is changed according to applied voltages.

Electrochromic devices may be applied to light-weight and portable display devices, such as electronic paper, as well as to a devices using light transmittance such as a smart windows.

SUMMARY

Example embodiments relate to an electrochromic device.

According to example embodiments, an electrochromic device includes a pixel including a first sub-pixel and a second sub-pixel. The first sub-pixel includes a first electrolyte contacting a first electrochromic layer. The first electrochromic layer includes a first electrochromic material configured to display each one of transparency and at least two colors, based on a voltage applied to the first electrochromic material. The second sub-pixel includes a second electrolyte contacting a second electrochromic layer. The second electrochromic layer includes a second electrochromic material configured to display each one of transparency, black, and at least one color other than black, based on a voltage applied to the second electrochromic layer.

The electrochromic device may further include: a first electrode on one surface of the first sub-pixel; a first terminal on another surface of the first sub-pixel; a second electrode on one surface of the second sub-pixel; and a second terminal on the other surface of the second sub-pixel.

The electrochromic device may be configured to apply equal or different voltages to the first electrode and the second electrode. The electrochromic device may also be configured to apply equal or different voltage to the first terminal and the second terminal.

The first electrochromic material and the second electrochromic material may be different from each other. The first electrochromic material and the second electrochromic material may each independently include one of an n type material, a p type material, and a combination thereof.

For example, the first electrochromic material and the second electrochromic material may each independently include one of: an n type material including at least one of an n type metal oxide, a viologen-based compound, a phthalate-based compound, a pyridine-based compound, an anthraquinone-based compound, a cathodic discoloring conductive polymer compound, and a combination thereof; a p type material including at least one a p type metal oxide, a phenyl amine-based compound, an aminoquinone-based compound, a rare earth element-based organic compound, a phthalocyanine-based compound, a phenothiazine-based compound, a phenoxathiine-based compound, a dibenzodioxin-based compound, a dye-based compound, an anodic discoloring conductive polymer compound, and a combination thereof; and a combination thereof.

The first electrochromic layer and the second electrochromic layer may be separated from each other so the first electrochromic layer and the second electrochromic layer are configured to independently display colors of the first electrochromic and the second electrochromic materials respectively.

The first electrochromic material may display transparency when the voltage applied to the first electrochromic material equals a first voltage. The first electrochromic material may display one of at least two colors when the voltage applied to the first electrochromic materials equals one of a second voltage and a third voltage, respectively. The first voltage, second voltage, and the third voltage are different from each other.

The second electrochromic material may display transparency when the voltage applied to the second electrochromic material equals the first voltage. The second electrochromic material may display black when the voltage applied to the second electrochromic material equals one of the second voltage and the third voltage. The second electrochromic material may display one of the at least one color other than black when the voltage applied to the second electrochromic material equals the other of the second voltage and the third voltage.

The first electrochromic material and the second electrochromic material may display different colors when the voltage applied to the first electrochromic material equals the second voltage and the voltage applied to the second electrochromic material equals the second voltage.

The first electrochromic material and the second electrochromic material may display different colors when the voltage applied to the first electrochromic material equals the third voltage and the voltage applied to the second electrochromic material equals the third voltage.

The first electrochromic material may display at least one of red, green, and blue, respectively, when the voltage applied to the first electrochromic material equals at least one of the second voltage and the third voltage. The second electrochromic material may display at least one of red, green, blue, and black, respectively, when the voltage applied to the second electrochromic material equals at least one of the second voltage and the third voltage.

The first electrochromic material may display at least one of cyan, magenta, and yellow, respectively, when the voltage applied to the first electrochromic material equals at least one of the second voltage and the third voltage; and the second electrochromic material may display at least one of cyan, magenta, yellow, and black, respectively, when the voltage applied to the second electrochromic layer equals at least one of the second voltage and the third voltage.

The first electrochromic material may display at least one of cyan, magenta, and yellow, respectively, when the voltage applied to the first electrochromic material equals at least one of the second voltage and the third voltage. The second electrochromic material may display at one of red, green, blue, and black, respectively, when the voltage applied to the second electrochromic material equals at least one of the second voltage and the third voltage.

The first electrochromic material may display at least one of red, green, and blue, respectively, when the voltage applied to the first electrochromic material equals at least one of the second voltage and the third voltage. The second electrochromic material may display at least one of cyan, magenta, yellow, and black, respectively, when the voltage applied to the second electrochromic material equals at least one of the second voltage and the third voltage.

The first sub-pixel and the second sub-pixel may display transparency when the voltage applied to the first electrochromic material and the voltage applied to the second electrochromic material equals the first voltage. The first sub-pixel may display at least one of the at least two colors, and the second sub-pixel may display at least one of black and the at least one color other than black when the voltage applied to the first electrochromic material and the voltage applied to the second electrochromic material equals the second voltage. The color displayed by the first sub-pixel and the color display by the second sub-pixel may be different from each other when the voltage applied to the first electrochromic material and the voltage applied to the second electrochromic material equals the third voltage.

The first electrolyte may include an opposing type of material to the first electrochromic material. The second electrolyte may include an opposing type of material to the second electrochromic layer.

The electrochromic device may include at least one spacer separating the first sub-pixel and the second sub-pixel.

The first sub-pixel may further include a first reflecting layer. The first reflecting layer may face the first electrochromic layer across the first electrolyte.

The second sub-pixel may further include a second reflecting layer. The second reflecting layer may face the second electrochromic layer across the second electrolyte.

The electrochromic device may include a plurality of the pixels.

The electrochromic device may further include at least one pair of electrodes on a substrate. The pixel may be between the at least one pair of electrodes.

The pixel may include at least one spacer separating the first sub-pixel and the second sub-pixel. The first sub-pixel and the second sub-pixel may be between one pair of the at least one pair of electrodes.

The one pair of the at least one pair of electrodes may include a non-transparent electrode.

The non-transparent electrode may include a reflecting layer. At least one of the first electrolyte and the second electrolyte may be on the reflecting layer.

The electrochromic device may further include at least one reflecting layer, wherein the at least one reflecting layer is on one electrode of the one pair of the at least one pair of electrodes.

The electrochromic device may further include a controller configured to apply equal or different voltages to the first sub-pixel and the second sub-pixel through the at least pair of electrodes.

The pixel may be connected to two pairs of electrodes. The first sub-pixel may be between one pair of the two pairs of electrodes. The second sub-pixel may be between the other pair of the two pairs of electrodes.

The substrate may further include one of glass and transparent polymer.

The substrate may be a transparent polymer including at least one of polyacrylate, polyetheylene ether phthalate, polyethylene naphthalate, polycarbonate, polyarylate, polyetherimide, polyesthersulfone, polyethylene terephthalate, and polyimide.

According to example embodiments, a pixel structure includes a lower electrode layer, a first sub-pixel connected to the lower electrode layer, a second sub-pixel connected to the lower electrode layer, and an upper electrode layer on the first sub-pixel and the second sub-pixel. The first sub-pixel may include a first electrolyte contacting a first electrochromic layer. The first electrochromic layer may include a first electrochromic material configured to display each one of transparency and at least two colors, based on a voltage applied to the first electrochromic material. The second sub-pixel may include a second electrolyte contacting a second electrochromic layer. The second electrochromic layer may include a second electrochromic material configured to display each one of transparency, black, and at least one color other than black, based on a voltage applied to the second electrochromic material.

An electrochromic device may include a plurality of the pixel structures.

An electronic device may include the electrochromic device, wherein the electronic device includes one of a smart window, a display device, and a transparent display device.

According to example embodiments, an electrochromic device may include a pixel structure connected to at least one pair of electrodes. The pixel structure may include a first sub-pixel and a second sub-pixel. The first sub-pixel may contain a first electrochromic layer on a first electrolyte. The first electrochromic layer may be configured to display each one of transparency and at least two colors, based on a voltage applied to the first sub-pixel. The second sub-pixel may include a second electrochromic layer on a second electrolyte. The second electrochromic layer may be configured to display each one of transparency, black, and at least one color other than black, based on a voltage applied to the second sub-pixel.

The first electrochromic layer may include at least one different material than the second electrochromic layer. The first electrochromic layer and the second electrochromic layer may each independently include one of an n type material, a p type material, and a combination thereof. For example, the first electrochromic material and the second electrochromic material may each independently include one of: an n type material selected from including at least one of an n type metal oxide, a viologen-based compound, a phthalate-based compound, a pyridine-based compound, an anthraquinone-based compound, a cathodic discoloring conductive polymer compound, and a combination thereof; a p type material selected from including at least one a p type metal oxide, a phenyl amine-based compound, an aminoquinone-based compound, a rare earth element-based organic compound, a phthalocyanine-based compound, a phenothiazine-based compound, a phenoxathiine-based compound, a dibenzodioxin-based compound, a dye-based compound, an anodic discoloring conductive polymer compound, and a combination thereof; and a combination thereof.

The first electrochromic layer may include a first electrochromic material represented by one of the following Chemical Formulae 1 to 2:

[Chemical Formula 1]
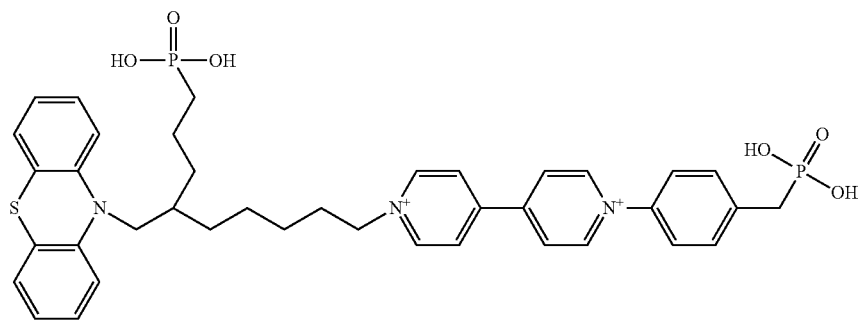
[Chemical Formula 2]
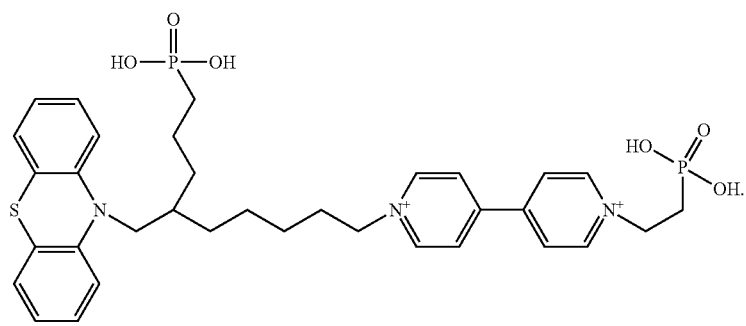
The second electrochromic layer include a second electrochromic material represented by one of the following Chemical Formulae 3 to 4:
[Chemical Formula 3]
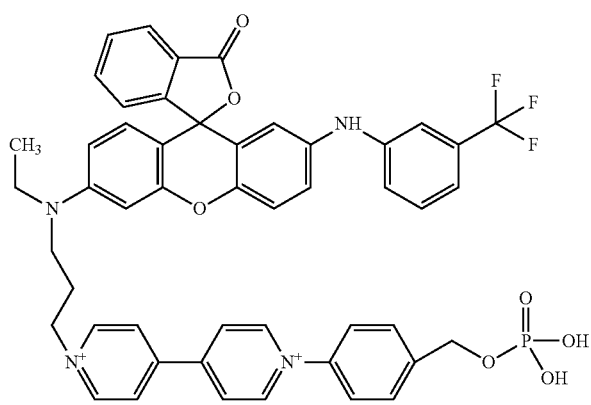

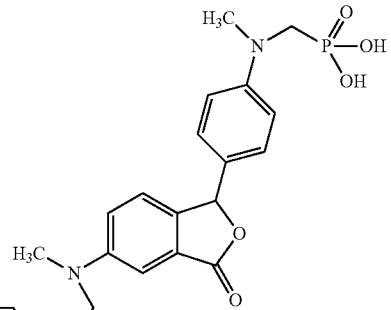

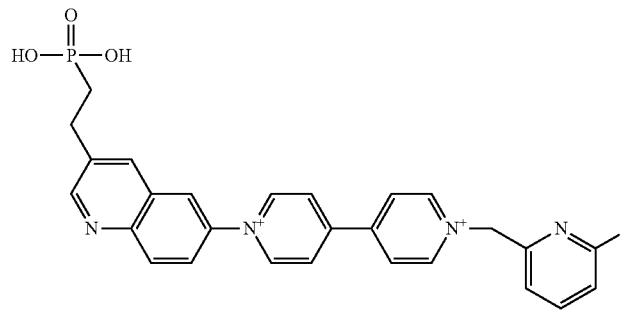

The first electrochromic layer may include a pair of electrochromic materials represented by one of the following pair of Chemical Formulae 1-1 and 1-2:

[Chemical Formula 1-1]

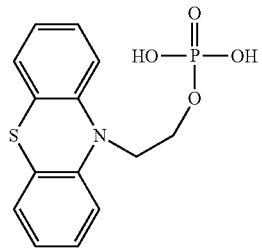

[Chemical Formula 1-2]

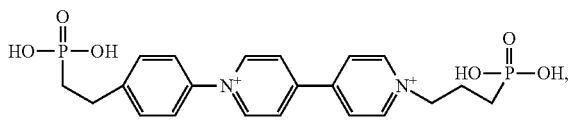

and the following pair of Chemical Formulae 2-1 and 2-2,

[Chemical Formula 2-1]

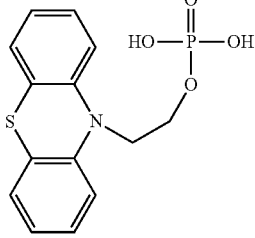

[Chemical Formula 2-2]

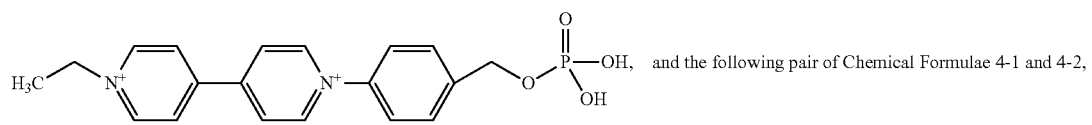

The second electrochromic layer may include a pair of electrochromic materials represented by one of:

the following pair of Chemical Formulae 3-1 and 3-2,

[Chemical Formula 3-1]

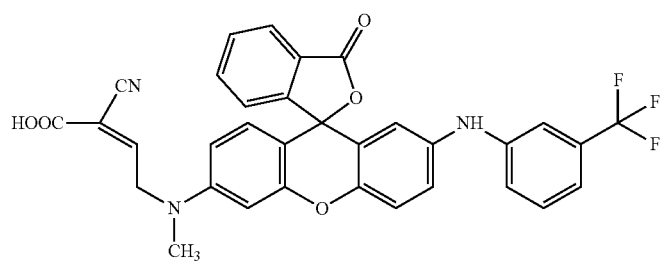

[Chemical Formula 3-2]

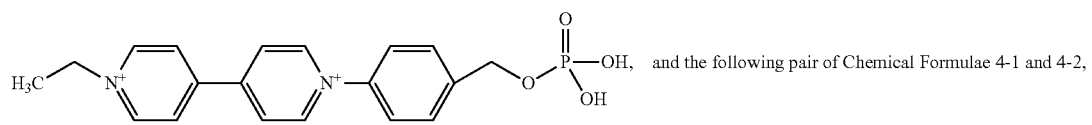

and the following pair of Chemical Formulae 4-1 and 4-2,

[Chemical Formula 4-1]

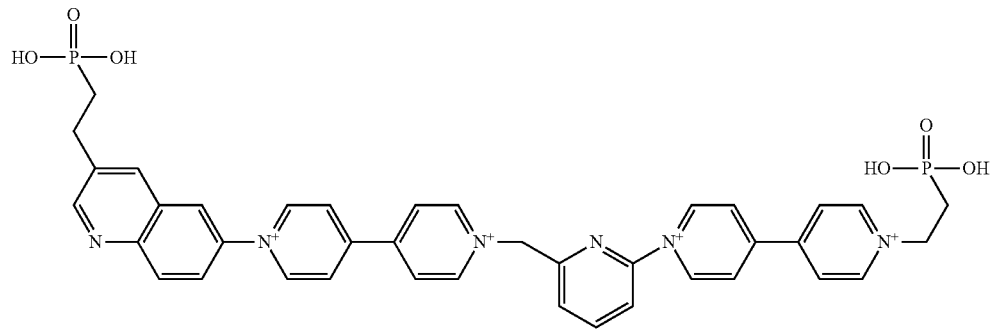

[Chemical Formula 4-2]

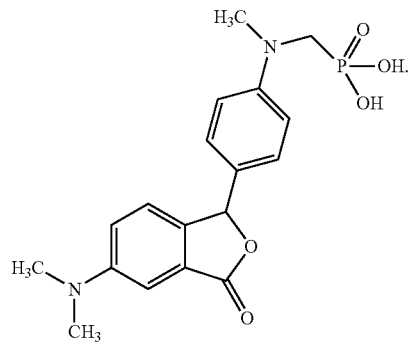

Various colors may be displayed by changing a voltage without introducing a color filter, a sub-pixel of three primary colors, or the stacking structure of panels of three primary colors. Thereby, the efficiency may be improved by decreasing light loss due to the color filter, and the process may be simplified and the resolution may be increased so as to also improve the color characteristics.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing and other features and advantages of example embodiments will be apparent from the more particular description of non-limiting embodiments, as illustrated in the accompanying drawings in which like reference characters refer to the same parts throughout the different views. The drawings are not necessarily to scale, emphasis instead being placed upon illustrating the principles of example embodiments. In the drawings.

DETAILED DESCRIPTION

Figure 1:
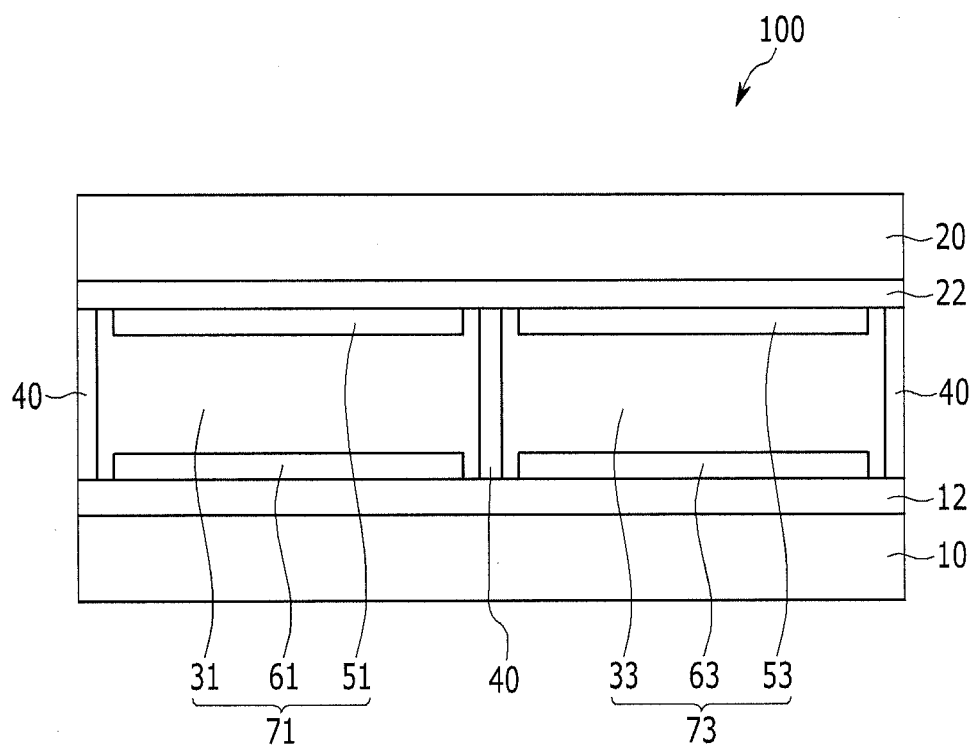
FIG. 1 is a cross-sectional view showing an electrochromic device according to example embodiments.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scopes of example embodiments of inventive concepts to those of ordinary skill in the art. In the drawings, the thicknesses of layers and regions are exaggerated for clarity.

Like reference numerals in the drawings denote like elements, and thus their description will be omitted. When a part such as a layer, a film, a substrate or the like is being "on"

other constituent element, it includes the cases that another constituent element is interposed as well as it is being "directly on" the other element. Otherwise, when an element is referred to as being "directly on" another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As used herein, when a specific definition is not otherwise provided, the term "combination" refers to mixing or copolymerization. Also, the term "copolymerization" refers to block copolymerization, random copolymerization, or graft copolymerization.

According to example embodiments, an electrochromic device includes a first sub-pixel including a first electrochromic layer including a first electrochromic material displaying each one selected from transparency and at least two colors depending upon a voltage and a first electrolyte contacting the first electrochromic layer, and a second sub-pixel including a second electrochromic layer including a second electrochromic material displaying each one selected from transparency, black, and at least one color other than black depending upon a voltage and a second electrolyte contacting the second electrochromic layer.

FIG. 1 is a cross-sectional views showing an electrochromic device according to example embodiments.

Referring to FIG. 1, the electrochromic device 100 according to example embodiments includes: at least one lower substrate 10 and at least one upper substrate 20 facing each other and fixed by at least one spacer 40; a lower electrode 12 and an upper electrode 22 disposed on one surface of the lower substrate 10 and the upper substrate 20, respectively; and a first sub-pixel 71 and a second sub-pixel 73 separated between the lower electrode 12 and the upper electrode 22 by, for example, at least one spacer 40. A pixel of the electrochromic device 100 may include the first sub-pixel 71 and the second sub-pixel 72.

Although FIG. 1 shows the first sub-pixel 71 and the second sub-pixel 73 on one lower electrode 12, example embodiments are not limited thereto, and the lower electrode 12 may be separated into a first lower electrode disposed under the first sub-pixel 71 and a second lower electrode disposed under the second sub-pixel 73. In this case, the first lower electrode and the second lower electrode may be applied with the same or different voltages, respectively. The electrochromic device may include and/or be connected to a controller (not shown) that is configured to control the application of voltages to the first lower electrode and the second lower electrode.

Likewise, FIG. 1, shows the upper electrode 22 is on to the first sub-pixel 71 and the second sub-pixel 73, but example embodiments are not limited thereto. The upper electrode may be separated into a first upper electrode disposed on the first sub-pixel 71 and a second upper electrode disposed on the second sub-pixel 73. In this case, the first upper electrode and the second upper electrode may be applied with the same or different voltages from each other, respectively. The electrochromic device may include and/or be connected to a controller (not shown) that is configured to control the application of voltages to the first upper electrode and the second upper electrode.

The first sub-pixel 71 includes: a first electrolyte 31 filled between the lower electrode 12 and the upper electrode 22; a first electrochromic layer 51 disposed on one surface of the upper electrode 22 and contacting the first electrolyte 31; and a first reflecting layer 61 disposed on one surface of the lower electrode 12 and contacting the first electrolyte 31. The first electrochromic layer 51 may display each one selected from transparency and at least two colors depending upon a voltage.

The second sub-pixel 73 includes: a second electrolyte 33 filled between the lower electrode 12 and the upper electrode 22; a second electrochromic layer 53 disposed on one surface of the upper electrode 22 and contacting the second electrolyte 33; and a second reflecting layer 63 disposed on one surface of the lower electrode 12 and contacting the second electrolyte 33. The second electrochromic layer 53 may display each one selected from transparency, black, and at least one color other than black depending upon a voltage.

Thereby, the electrochromic device 100 may display colors including each one selected from transparency, black, and at least three colors other than black depending upon a voltage.

In FIG. 1, the electrochromic device 100 includes the spacer 40 between the first sub-pixel 71 and the second sub-pixel 73, and the electrochromic device 100 includes a first reflecting layer 61 and a second reflecting layer 63, but example embodiments are not limited thereto. Each spacer 40 between the first sub-pixel 71 and the second sub-pixel 73, and the first reflecting layer 61 and the second reflecting layer 63, may be selectively omitted. For example, when the spacer 40 is omitted between the first sub-pixel 71 and the second sub-pixel 73, the first reflecting layer 61 and the second reflecting layer 63 may be connected to each other, and a lower electrode 12 may be provided under the first reflecting layer 61 and the second reflecting layer.

The lower substrate 10 and the upper substrate 20 may be made of transparent glass or polymer. The polymer may include at least one selected from, for example, polyacrylate, polyethylene ether phthalate, polyethylene naphthalate, polycarbonate, polyarylate, polyetherimide, polyethersulfone, polyethylene terephthalate, and polyimide, but example embodiments are not limited thereto.

At least one selected from the lower electrode 12 and the upper electrode 22 may be made of a transparent conductor, for example a transparent conductive oxide, but example embodiments are not limited thereto. Each of them may include, for example, an inorganic conductive material such as indium tin oxide (ITO), fluorine tin oxide (FTO), or antimony doped tin oxide (ATO), or an organic conductive material such as polyacetylene or polythiophene, but example embodiments are not limited thereto. The lower electrode 12 and the upper electrode 22 may be obtained by laminating or coating a single conductive material or a mixture of at least two of the conductive materials.

On the other hand, when the electrochromic device is reflective, and the display is acquired through the upper electrode 22, the lower electrode 12 may be non-transparent.

The first electrolyte 31 and the second electrolyte 33 may supply a material for accelerating oxidation/reduction of the electrochromic material, or since the electrochromic material is dissolved therein, it may display the additional colors according to the oxidation/reduction potential of the upper electrode 22 or may compensate the color of the first electrochromic layer 51 and the second electrochromic layer 53.

The first electrolyte 31 and the second electrolyte 33 may be a liquid electrolyte or a solid polymer electrolyte.

The liquid electrolyte may be provided by dissolving, for example, a lithium salt such as LiOH or LiClO$_4$, a potassium salt such as KOH, a sodium salt such as NaOH, an ammonium salt such as tetrabutyl ammonium hexafluorophosphate or tetrabutyl ammonium perchlorate in an electrolyte solvent, but is not limited thereto. The electrolyte solvent may include an organic solvent such as propylene carbonate, ethylene carbonate, polyethylene glycol, N-methylpyrrolidone, toluene, xylene, propylene glycol benzene, methylethylketone, tetrahydrofuran, acetonitrile, or the like, an ionic liquid, and so on, but is not limited thereto.

The solid polymer electrolyte may be prepared by dissolving, for example, poly(2-acrylamino-2-methylpropane sulfonic acid), poly(ethylene oxide), polyvinyl pyrrolidone, polyacrylate, or the like in the electrolyte solvent, but is not limited thereto.

The spacer 40 may include an insulating material or a sealing material, but example embodiments are not limited thereto.

The first electrochromic layer 51 and the second electrochromic layer 53 include different electrochromic materials from each other. The electrochromic material is a compound that may reversibly display color by the electrochemical change depending upon the electric field direction when applying a voltage. It may display the inherent color according to the material.

The first electrochromic layer 51 and the second electrochromic layer 53 may independently be materials including an n type, a p type, or a combination thereof. For example, the first electrochromic layer 51 and the second electrochromic layer 53 may include an n type electrochromic material, a p type electrochromic material, or an n type-p type electrochromic material. Further, the first electrochromic layer 51 and the second electrochromic layer 53 may independently include an n type-p type electrochromic material.

The n type electrochromic material may be a cathodic coloration material displaying color in a reduction state and turning transparent in an oxidation state. The n type electrochromic material may be a material displaying different colors depending upon the reduction level. For example, the n type electrochromic material may display the different colors with a first reduction voltage and a second reduction voltage, so it may display more various colors when using the electrochromic material.

The p type electrochromic material may be an anodic coloration material which displays color in the oxidation state and turns transparent in the reduction state. The p type electrochromic material may be a material displaying the different colors depending upon the oxidation level. For example, the p type electrochromic material may display different colors in with a first oxidation voltage and a second oxidation voltage, so it may display more various colors when using the electrochromic material.

On the other hand, the n type-p type electrochromic material may be a material displaying an n type segment color in a reduction state and a p type segment color in an oxidation state, and transparency in a neutral state.

As above, when the first electrochromic layer 51 includes an n type electrochromic material, a p type electrochromic material, or an n type-p type electrochromic material, the first electrolyte 31 may undergo a stable electrochemical reaction by including the opposing type of material to the first electrochromic layer 51. For example, when the first electrochromic layer 51 includes an n type of electrochromic material, the first electrolyte 31 may include a p type material; when the first electrochromic layer 51 includes a p type electrochromic material, the first electrolyte 31 may include an n type material; and when the first electrochromic layer 51 includes an n type-p type electrochromic material, the first electrolyte 31 may include a p type-n type material.

Likewise, when the second electrochromic layer 53 includes an n type electrochromic material, a p type electrochromic material, or an n type-p type electrochromic material, the second electrolyte 33 may undergo the stable electrochemical reaction by including the opposing type of material to the second electrochromic layer 53. For example, when the second electrochromic layer 53 includes an n type electrochromic material, the second electrolyte 33 may include a p type material; when the second electrochromic layer 53 includes a p type electrochromic material, the second electrolyte 33 may include an n type material; and when the second electrochromic layer 53 includes an n type-p type electrochromic material, the second electrolyte 33 may include a p type-n type material.

The first electrochromic material may display each one selected from transparency and at least two colors depending upon a voltage, and the second electrochromic material may display each one selected from transparency, black, and at least one color other than black depending upon a voltage. For example, the first electrochromic material and the second electrochromic material may be selected not to display the same color at the same voltage unless displaying transparency.

The first electrochromic material and the second electrochromic material may independently include: an n type material selected from an n type metal oxide such as tungsten oxide (e.g., $WO_3$), molybdenum oxide (e.g., $MoO_3$), titanium oxide (e.g., $TiO_2$), a viologen-based compound, a phthalate-based compound such as an isophthalate, a pyridine-based compound, an anthraquinone-based compound, a cathodic discoloring conductive polymer compound, and a combination thereof; a p type material selected from a p type metal oxide such as vanadium oxide (e.g., $V_2O_5$), iridium oxide (e.g., $IrO_2$), niobium oxide (e.g., $Nb_2O_5$), and nickel oxide (e.g., NiO); a phenyl amine-based compound, an aminoquinone-based compound, a rare earth element-based organic compound, a phthalocyanine-based compound, a phenothiazine-based compound, a phenoxathiine-based compound, a dibenzodioxin-based compound, a dye-based compound such as a Leuco dye, or the like, an anodic discoloring conductive polymer compound, and a combination thereof; or a combination thereof.

For example, the first electrochromic material may include a compound represented by the following Formula 1, a compound represented by the following Formula 1-1, a compound represented by the following Formula 1-2, a compound represented by the following Formula 2, a compound represented by the following Formula 2-1, a compound represented by the following Formula 2-2, or a combination thereof, but is not limited thereto.

The compound represented by the following Formula 1 may display transparency in the neutral state, red in the oxidation state, and green in the reduction state. The compound represented by the Following formula 1-1 may display transparency in the neutral state and red in the oxidation state. The compound represented by the following Formula 1-2 may display transparency in the neutral state and green in the reduction state.

[Chemical Formula 1]

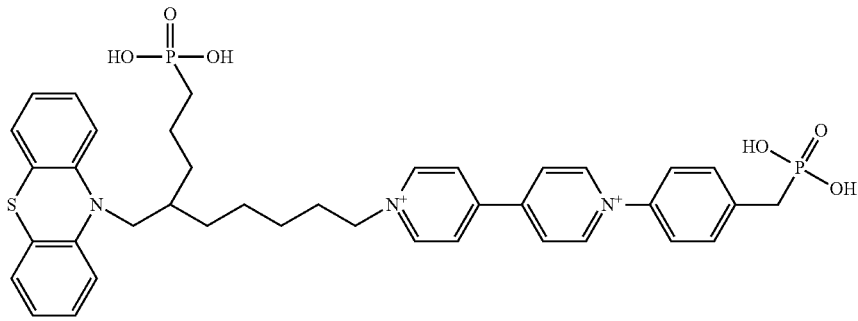

[Chemical Formula 1-1]

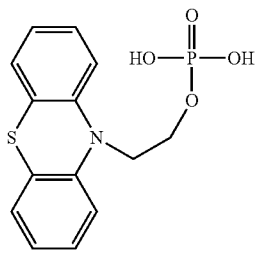

[Chemical Formula 1-2]

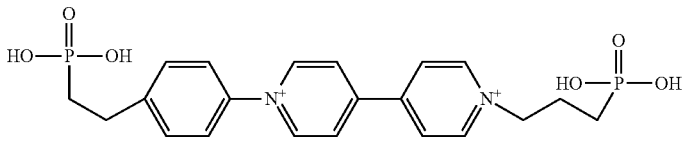

On the other hand, the compound represented by the following Formula 2 may display transparency in the neutral state, red in the oxidation state, and blue in the reduction state. The compound represented by the following Formula 2-1 may display transparency in the neutral state and red in the oxidation state.

The compound represented by the following Formula 2-2 may display transparency in the neutral state and blue in the reduction state.

[Chemical Formula 2]

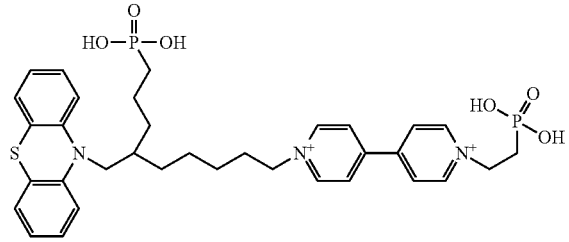

[Chemical Formula 2-1]

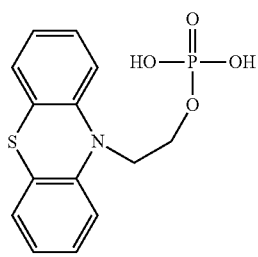

[Chemical Formula 2-2]

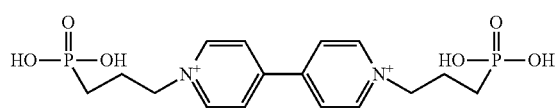

oxidation state, and green in the reduction state. The compound represented by the following Formula 3-1 may display transparency in the neutral state and black in the oxidation state. The compound represented by the following Formula 3-2 may display transparency in the neutral state and green in the reduction state.

[Chemical Formula 3]

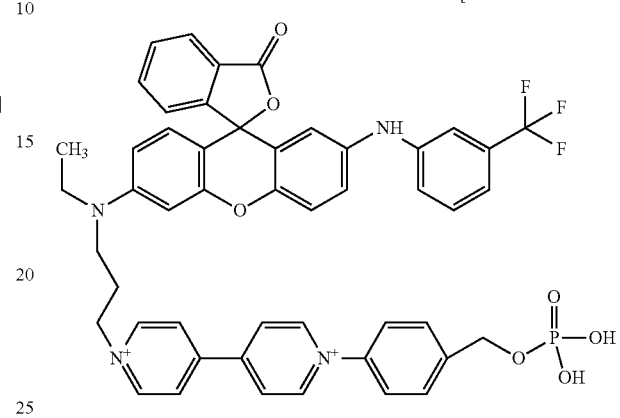

[Chemical Formula 3-1]

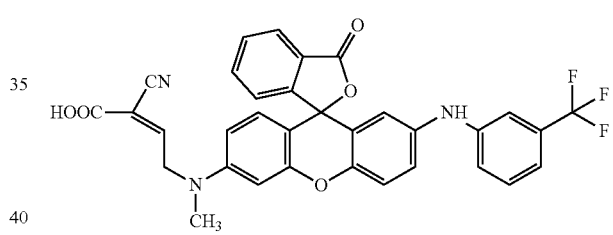

[Chemical Formula 3-2]

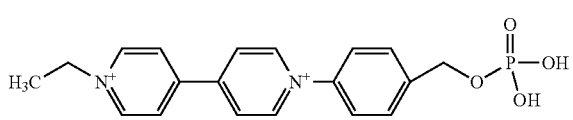

For example, the second electrochromic material may include a compound represented by the following Formula 3, a compound represented by the following Formula 3-1, a compound represented by the following Formula 3-2, a compound represented by the following Formula 4, a compound represented by the following Formula 4-1, a compound represented by the following Formula 4-2, or a combination thereof, but is not limited thereto.

The compound represented by the following Formula 3 may display transparency in the neutral state, black in the On the other hand, the compound represented by the following Formula 4 may display transparency in the neutral state, blue in the oxidation state, and black in the reduction state. The compound represented by the following Formula 4-1 may display transparency in the neutral state and black in the reduction state. The compound represented by the following Formula 4-2 may display transparency in the neutral state and blue in the oxidation state.

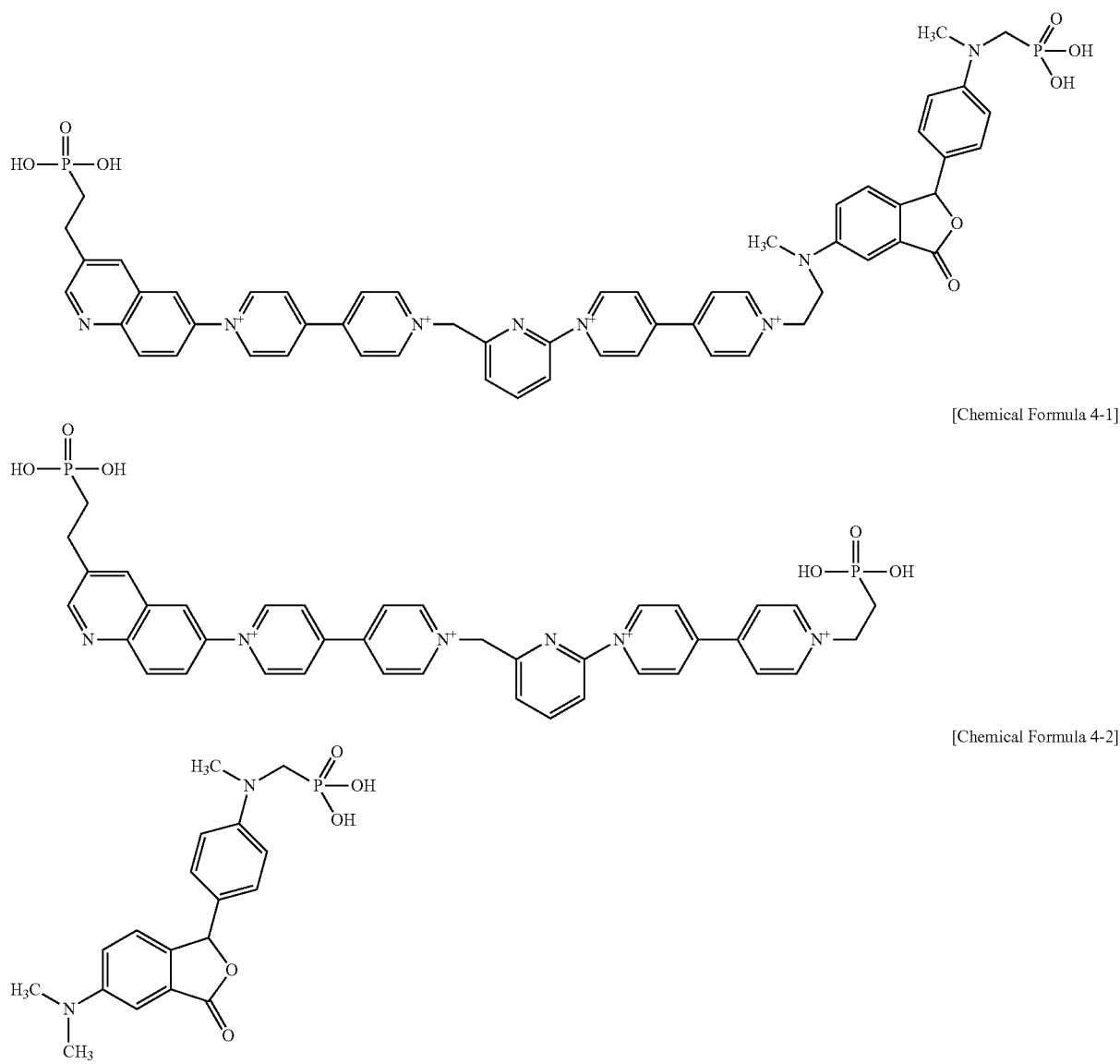

The first electrochromic layer 51 includes the first electrochromic material, the second electrochromic layer 53 includes the second electrochromic material, and the first electrochromic layer 51 and the second electrochromic layer 53 are separated from each other, so the first electrochromic layer 51 may independently show the inherent color displayed by the first electrochromic material, and the second electrochromic layer 53 may independently show the inherent color displayed by the second electrochromic material. In addition, the color displayed by the first electrochromic layer 51 is determined by the color displayed by the first sub-pixel 71, and the color displayed by the second electrochromic layer 53 is determined by the color displayed by the second sub-pixel 73.

This is described with reference to FIGS. 2A and 2B together with FIG. 1.

Figure 2A:
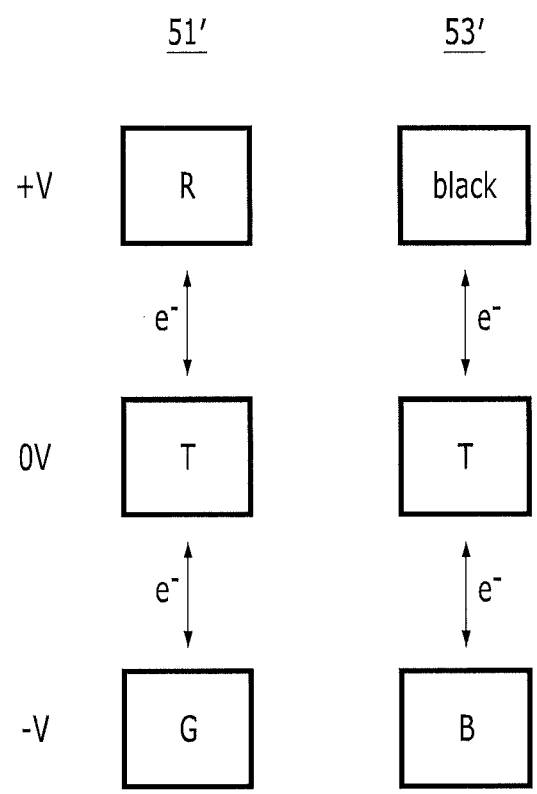
FIG. 2A is a schematic diagram showing color displayed by each sub-pixel by an electrochemical reaction depending upon application of the voltage in an electrochromic device according to example embodiments.

FIG. 2A is a schematic diagram showing the color displayed in the first electrochromic layer 51' and the second electrochromic layer 53' by the electrochemical reaction depending upon applying a voltage in an electrochromic device according to example embodiments.

For better understanding and ease of description, the first column in FIG. 2A shows that the color display of the first electrochromic layer 51' is changed depending upon the voltage, and the second column shows that the color display of the second electrochromic layer 53' is changed depending upon the voltage.

In FIG. 2A, the first electrochromic material includes an electrochromic material displaying a transparent state when applying no voltage but changing the color to red (R) in the oxidation state of a positive (+) voltage and changing the color to green (G) in the reduction state of a negative (−) voltage. The second electrochromic material includes an electrochromic material displaying a transparent state when applying no voltage but changing the color to black in the oxidation state of a positive (+) voltage and changing the color to blue (B) in the reduction state of a negative (−) voltage.

In following description, for better understanding and ease of description, the voltage indicates the voltage level with reference to the upper electrode 22, and the negative (−) voltage indicates that the negative voltage is applied to the upper electrode 22. In this case, the positive (+) voltage is applied to the lower electrode 12. Thereby, the upper electrode 22 becomes a cathode that supplies electrons, and the lower electrode 12 becomes an anode that receives electrons.

The positive (+) voltage means that the positive voltage is applied to the upper electrode 22. In this case, the negative voltage is applied to the lower electrode 12. Thereby, the upper electrode 22 becomes an anode that receives electrons, and the lower electrode 12 becomes a cathode that supplies electrons.

Referring to FIG. 2A, when the voltage is not applied, both the first electrochromic layer 51' and the second electrochromic layer 53' may display transparency (T). In this case, the first sub-pixel 71 and the second sub-pixel 73 may display transparency (T) without displaying color. When the first sub-pixel 71 and the second sub-pixel 73 display transparency (T), they may display white having high reflectance of about 40% or higher.

On the other hand, when applying the positive (+) voltage, the first electrochromic material of the first electrochromic layer 51' may be oxidized to display a deeper red depending upon increasing the positive (+) voltage, and the second electrochromic material of the second electrochromic layer 53' may be oxidized to display a deeper black depending upon increasing the positive (+) voltage. In this case, the first sub-pixel 71 may display red (R) and the second sub-pixel 73 may display black. Resultantly, a pixel may display a reddish color by associating the first sub-pixel 71 and the second sub-pixel 73 and display red having the various gray-scale characteristics depending upon the positive (+) voltage level.

On the other hand, when applying the negative (−) voltage, the first electrochromic material of the first electrochromic layer 51' may be reduced to display a deeper green (G) depending upon increasing the negative (−) voltage, and the second electrochromic material of the second electrochromic layer 53' may be reduced to display a deeper blue (B) depending upon increasing the negative (−) voltage. In this case, the first sub-pixel 71 may display green (G) and the second sub-pixel 73 may display blue (B). Resultantly, a pixel may display a cyanic color displaying the reflectance spectrum range of green and blue by associating the first sub-pixel 71 and the second sub-pixel 73 and may display cyan having the various gray-scale characteristics depending upon the negative (−) voltage level.

The first reflecting layer 61 and the second reflecting layer 63 may display color to the outside by reflecting the light transmitted through the first electrochromic layer 51' and the second electrochromic layer 53', respectively, so the electrochromic device 100 may be applied to a reflective device.

The first reflecting layer 61 and the second reflecting layer 63 may include one of titanium oxide (e.g., $TiO_2$), a metal electrode having an embossing structure such as an Al electrode having embossing structure, a porous film material having an excellent white-reflecting characteristic, and a combination thereof, but example embodiments are not limited thereto.

However, the first reflecting layer 61 and the second reflecting layer 63 are not essential elements of the electrochromic device 100, and may be omitted if required. When the first reflecting layer 61 and the second reflecting layer 63 are omitted, the electrochromic device 100 may be used for a transparent display element.

Figure 2B:
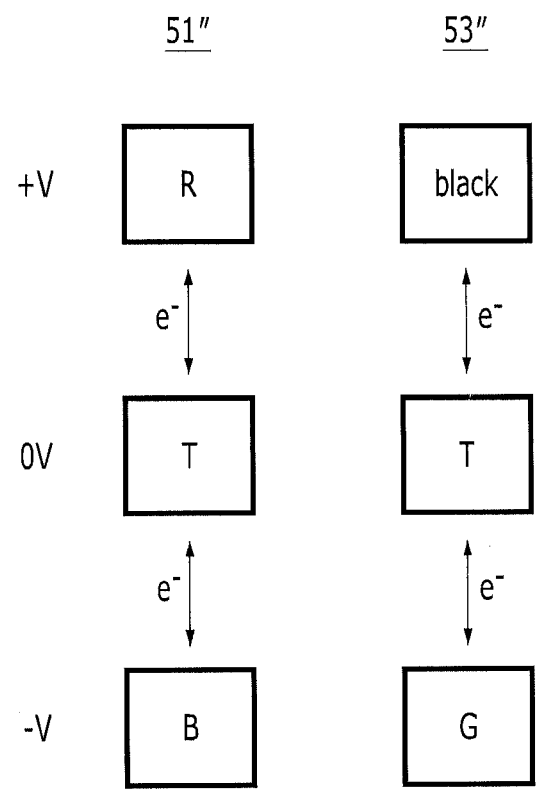
FIG. 2B is a schematic diagram showing color displayed by each sub-pixel by an electrochemical reaction depending upon application of the voltage in an electrochromic device according to example embodiments.

FIG. 2B is a schematic diagram showing the color displayed in the first electrochromic layer 51" and the second electrochromic layer 53" by the electrochemical reaction depending upon applying a voltage in an electrochromic device according to example embodiments.

For better understanding and ease of description, the first column in FIG. 2B shows that the color display of the first electrochromic layer 51" is changed depending upon the voltage, and the second column shows that the color display of the second electrochromic layer 53" is changed depending upon the voltage.

In FIG. 2B, the first electrochromic material includes an electrochromic material displaying a transparent state when applying no voltage but changing the color to red (R) in the oxidation state of a positive (+) voltage and changing the color to blue (B) in the reduction state of a negative (−) voltage. The second electrochromic material includes an electrochromic material displaying a transparent state when applying no voltage but changing the color to black in the oxidation state of a positive (+) voltage and changing the color to green (G) in the reduction state of a negative (−) voltage.

In following description, for better understanding and ease of description, the voltage indicates the voltage level with reference to the upper electrode 22, and the negative (−) voltage indicates that the negative voltage is applied to the upper electrode 22. In this case, the positive (+) voltage is applied to the lower electrode 12. Thereby, the upper electrode 22 becomes a cathode that supplies electrons, and the lower electrode 12 becomes an anode that receives electrons.

The positive (+) voltage means that the positive voltage is applied to the upper electrode 22. In this case, the negative voltage is applied to the lower electrode 12. Thereby, the upper electrode 22 becomes an anode that receives electrons, and the lower electrode 12 becomes a cathode that supplies electrons.

Referring to FIG. 2B, when the voltage is not applied, both the first electrochromic layer 51" and the second electrochromic layer 53" may display transparency (T). In this case, the first sub-pixel 71 and the second sub-pixel 73 may display transparency (T) without displaying color. When the first sub-pixel 71 and the second sub-pixel 73 display transparency (T), they may display white having high reflectance of about 40% or higher.

On the other hand, when applying the positive (+) voltage, the first electrochromic material of the first electrochromic layer 51" may be oxidized to display a deeper red depending upon increasing the positive (+) voltage, and the second electrochromic material of the second electrochromic layer 53" may be oxidized to display a deeper black depending upon increasing the positive (+) voltage. In this case, the first sub-pixel 71 may display red (R) and the second sub-pixel 73 may display black. Resultantly, a pixel may display a reddish color by associating the first sub-pixel 71 and the second sub-pixel 73 and display red having the various gray-scale characteristics depending upon the positive (+) voltage level.

On the other hand, when applying the negative (−) voltage, the first electrochromic material of the first electrochromic layer 51" may be reduced to display a deeper blue (B) depending upon increasing the negative (−) voltage, and the second electrochromic material of the second electrochromic layer 53" may be reduced to display a deeper green (G) depending upon increasing the negative (−) voltage. In this case, the first sub-pixel 71 may display blue (B) and the second sub-pixel 73 may display green (G). Resultantly, a pixel may display a cyanic color displaying the reflectance spectrum range of blue and green by associating the first sub-pixel 71 and the second sub-pixel 73 and may display cyan having the various gray-scale characteristics depending upon the negative (−) voltage level.

Now, an electrochromic device according to example embodiments is described with reference to FIG. 3.

Figure 3:
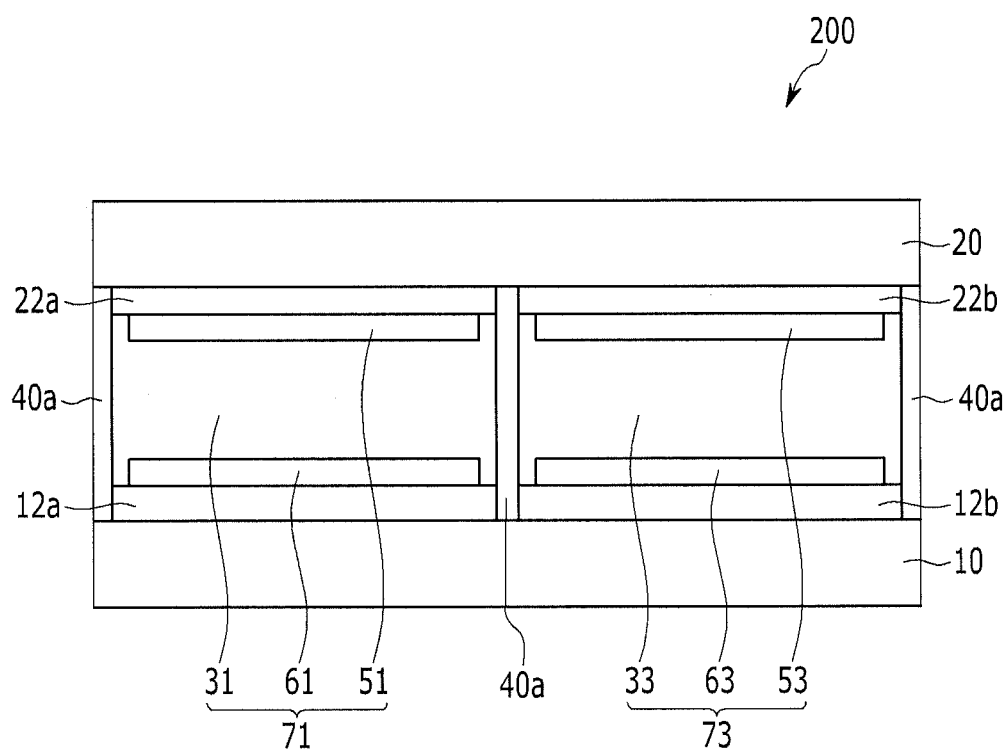
FIG. 3 is a cross-sectional view showing an electrochromic device according to example embodiments.

FIG. 3 is a cross-sectional view showing an electrochromic device according to example embodiments.

Referring to FIG. 3, the electrochromic device 200 according to example embodiments includes: a lower substrate 10 and a upper substrate 20 facing each other and fixed by a spacer 40a; a first lower electrode 12a and a second lower electrode 12b disposed on one surface of the lower substrate 10 and separated from each other; a first upper electrode 22a and a second upper electrode 22b disposed on one surface of the upper substrate 20 and separated from each other; a first sub-pixel 71 disposed between the first lower electrode 12a and the first upper electrode 22a; and a second sub-pixel 73 disposed between the second lower electrode 12b and the second upper electrode 22b. The first lower electrode 12a and the second lower electrode 12b, the first upper electrode 22a and the second upper electrode 22b, and the first sub-pixel 71 and the second sub-pixel 73 may be separated by a spacer 40a. Materials for the spacer 40a may be the same as the materials for the spacer 40, as described above.

Unless mentioned otherwise, the electrochromic device, the lower substrate, the upper substrate, the lower electrode, the upper electrode, the first sub-pixel, the second sub-pixel, and operation principles of the electrochromic device are the same as in the above.

The first lower electrode 12a and the second lower electrode 12b may be applied with the same or different voltages, respectively.

Likewise; the first upper electrode 22a and the second upper electrode 22b may be applied with the same or different voltages, respectively.

When the first lower electrode 12a adjacent to the first sub-pixel 71 and the second lower electrode 12b adjacent to the second sub-pixel 73 are provided to be separated from each other, and the first upper electrode 22a adjacent to the first sub-pixel 71 and the second upper electrode 22b adjacent to the second sub-pixel 73 are provided to be separated from each other, the voltage applied to the first electrochromic layer 51 and the voltage applied to second electrochromic layer 53 may be independently controlled. Thereby, more color combinations displayed by the first electrochromic layer 51 and the second electrochromic layer 53 may be available.

In FIG. 3, the first lower electrode 12a and the second lower electrode 12b, and the first upper electrode 22a and the second upper electrode 22b, are shown to be separated, but are not limited thereto. For example, the first lower electrode 12a and the second lower electrode 12b may be connected to each other to be applied with the same voltage. In addition, the first upper electrode 22a and the second upper electrode 22b may be connected to each other to be applied with the same voltage.

Hereinafter, as shown in FIG. 3, the color display of an electrochromic device in which the lower electrodes are separated and the upper electrodes are separated is described.

As an example, the first electrochromic material may be an electrochromic material that is transparent when not applying a voltage and may display red (R) in the oxidation state of a positive (+) voltage and blue (B) in the reduction state of a negative (−) voltage, and the second electrochromic material may be an electrochromic material that is transparent when not applying a voltage and may display black in the oxidation state of the positive (+) voltage and green (G) in the reduction state of the negative (−) voltage.

Hereinafter, unless mentioned otherwise, the electrochromic material, the first electrochromic material, the second electrochromic material, the positive (+) voltage, and the negative (−) voltage are the same as described above.

When the first electrochromic layer 51 is not applied with a voltage and the second electrochromic layer 53 is applied with the positive (+) voltage, the first electrochromic layer 51 may display transparency (T) and the second electrochromic layer 53 may display black. In this case, the first sub-pixel 71 may display transparency (T) and the second sub-pixel 73 may display black. Resultantly, a pixel may display black by combining the first sub-pixel 71 and the second sub-pixel 73. In addition, the second electrochromic layer 53 displays black having a gray scale depending upon the positive (+) voltage level, so the pixel may display black having various gray scales.

When the first electrochromic layer 51 is applied with the positive (+) voltage and the second electrochromic layer 53 is applied with the positive (+) voltage, that is, when the first sub-pixel 71 is applied with the positive (+) voltage and the second sub-pixel 73 is applied with the positive (+) voltage, the first electrochromic layer 51 may display a deeper red (R) depending upon increasing the positive (+) voltage, and the second electrochromic layer 53 may display a deeper black depending upon increasing the positive (+) voltage. In this case, the first sub-pixel 71 may display red (R) and the second sub-pixel 73 may display black. Resultantly, a pixel may display red having various gray scale characteristics depending upon the positive (+) voltage level by combining the first sub-pixel 71 and the second sub-pixel 73.

When the first electrochromic layer 51 is not applied with a voltage and the second electrochromic layer 53 is applied with a negative (−) voltage, that is, when the first sub-pixel 71 is not applied with a voltage and the second sub-pixel 73 is applied with the negative (−) voltage, the first electrochromic layer 51 may display transparency and the second electrochromic layer 53 may display a deeper green depending upon increasing the negative (−) voltage. In this case, the first sub-pixel 71 may display transparency and the second sub-pixel 73 may display green. Resultantly, a pixel may display green having various gray scale characteristics depending upon the negative (−) voltage level of the second sub-pixel by combining the first sub-pixel 71 and the second sub-pixel 73.

When the first electrochromic layer 51 is applied with the negative (−) voltage and the second electrochromic layer 53 is applied with the positive (+) voltage, that is, when the first sub-pixel 71 is applied with the negative (−) voltage and the second sub-pixel 73 is applied with the positive (+) voltage, the first electrochromic layer 51 may display a deeper blue (B) depending upon increasing the negative (−) voltage, and the second electrochromic layer 53 may display a deeper black depending upon increasing the positive (+) voltage. In this case, the first sub-pixel 71 may display transparent to blue (B), and the second sub-pixel 73 may display transparent (T) to black. Resultantly, a pixel may display blue (B) by combining the first sub-pixel 71 and the second sub-pixel 73 and may also display blue (B) having various gray scales depending upon the negative (−) voltage level of the first sub-pixel 71 and the positive (+) voltage level of the second sub-pixel 73.

When the first electrochromic layer 51 is applied with the positive (+) voltage and the second electrochromic layer 53 is applied with the negative (−) voltage, that is, when the first sub-pixel 71 is applied with the positive (+) voltage and the second sub-pixel 73 is applied with the negative (−) voltage, the first electrochromic layer 51 may display a deeper red (R)

depending upon increasing the positive (+) voltage, and the second electrochromic layer 53 may display a deeper green (G) depending upon increasing the negative (−) voltage. In this case, the first sub-pixel 71 may display red (R) and the second sub-pixel 73 may display green (G). Resultantly, a pixel may display yellow by combining the first sub-pixel 71 and the second sub-pixel 73 and may display yellow having various gray scales depending upon the voltage level of each sub-pixel.

Transparency (T), black, red (R), green (G), and blue (B) are examples above, but the operation principles may be applied in the same way to various combinations selected from transparency (T), black, red (R), green (G), blue (B), cyan, magenta, and yellow. In addition, it is not limited to the colors, but it may display more colors depending upon the electrochemical reaction of the electrochromic material.

An electrochromic device according to example embodiments may display white and black as well as the various colors without a color filter. In addition, three or more sub-pixels are generally required to display red, green, and blue, but electrochromic devices according to example embodiments may display the various colors by changing voltages in two sub-pixels. Accordingly, by using two sub-pixels, each one selected from, but not limited to, red, green, blue, black, and transparency (or white) may be displayed. Thereby, since the light loss caused due to the color filter is decreased, it may improve the efficiency as well as simplify the process. The color characteristics may be improved and the resolution may be enhanced compared to the case that red, green and blue are displayed in, for example, three sub-pixels, respectively, since, for example, red, green, and blue may be displayed in two sub-pixels.

On the other hand, the first electrochromic layer 51 and the second electrochromic layer 53 may include the first electrochromic material and the second electrochromic material as a form of being supported in nano-particles. The nano-particles may be a semiconductor material, for example, titanium oxide ($TiO_2$), zinc oxide (ZnO), tungsten oxide ($WO_3$), or a combination thereof. The nano-particles may have various forms of a spherical shape, a tetrahedral shape, a cylindrical shape, a triangular shape, a disc shape, a tripod shape, a tetrapod shape, a cube shape, a box shape, a star shape, a tube shape, or the like, and the nano-particles may have a size of about 1 nm to about 100 nm.

The surface area may be enlarged by using the electrochromic material supported in the nano-particles, so as to coat more electrochromic material. Thereby, the efficiency of the electrochromic device may be increased.

Otherwise, the first electrochromic layer 51 and the second electrochromic layer 53 may include a mixture of the first electrochromic material and the second electrochromic material with a polymer compound. The polymer compound may include, for example, polyvinyl pyrrolidone, polyvinyl butanol, or a combination thereof. The electrochromic material may be included at, for example, about 50 wt % to about 99 wt %, and the polymer compound may be included at about 1 wt % to about 50 wt % based on the total amount of the first electrochromic layer 51 or the second electrochromic layer 53. It may enhance the efficiency of the electrochromic device by including the electrochromic material and the polymer compound within the range.

An electrochromic device according to example embodiments includes one first sub-pixel and one second sub-pixel, but example embodiments are not limited thereto. According to example embodiments, an electrochromic device may include a plurality of pixels including the first sub-pixel and the second sub-pixel.

The first electrochromic material, the second electrochromic material, and the operation principle for displaying a plurality of colors with two sub-pixels may be applied to electrochromic devices according to example embodiments, and may also be applied to an electrophoretic display device, an electrowetting display device, a twist ball display device, and so on.

Figure 4:
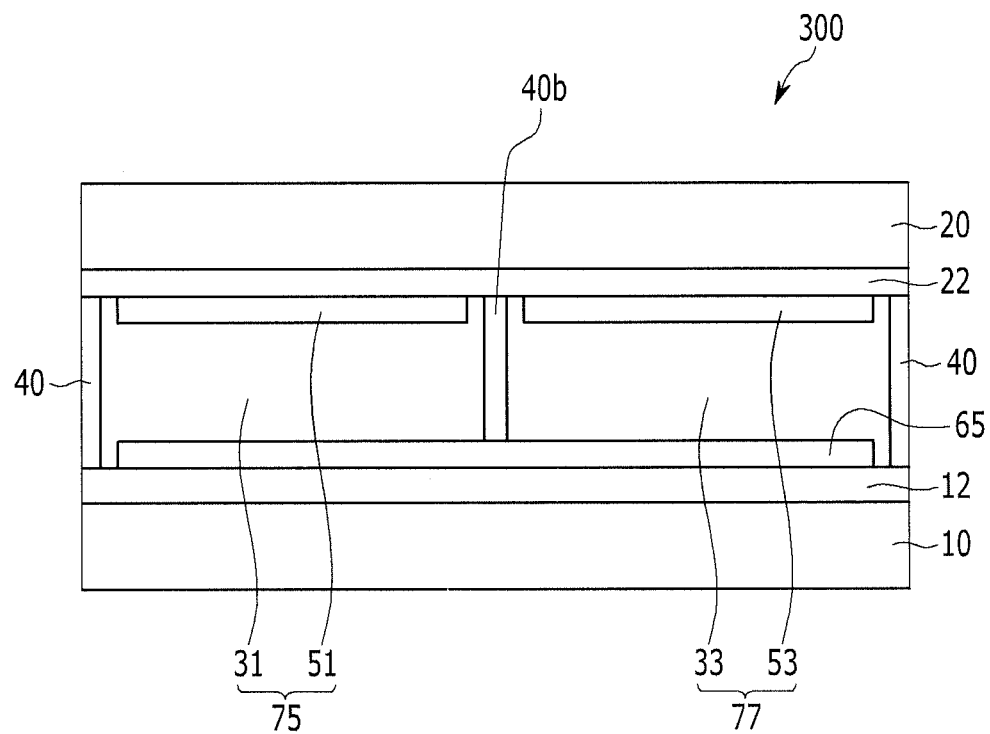
FIG. 4 is a cross-sectional view showing an electrochromic device according to example embodiments.

FIG. 4 is a cross-sectional view showing an electrochromic device according to example embodiments.

Referring to FIG. 4, the electrochromic device 300 according to example embodiments includes: a lower substrate 10 and a upper substrate 20 facing each other and fixed by spacers 40 and a middle spacer 40b; a lower electrode 12 and an upper electrode 22 disposed on one surface of the lower substrate 10 and the upper substrate 20, respectively; and a first sub-pixel 75 and a second sub-pixel 77 separated between the lower electrode 12 and the upper electrode 22 by, for example, at least one middle spacer 40b. A pixel of the electrochromic device 300 may include the first sub-pixel 75 and the second sub-pixel 77.

The first sub-pixel 75 includes the first electrolyte 31 filled between the lower electrode 12 and the upper electrode 22, and the first electrochromic layer 51 on one surface of the upper electrode 22 and contacting the first electrolyte 31. The second sub-pixel 77 includes the second electrolyte 33 filled between the lower electrode 12 and the upper electrode 22, and the second electrochromic layer 53 on one surface of the upper electrode 22 and contacting the second electrolyte 33.

The electrochromic device 300 in FIG. 4 may include at least one reflecting layer 65 common to the first sub-pixel 75 and the second sub-pixel 77. The reflecting layer 65 may be on the lower electrode layer 12. The first electrolyte 31 and the second electrolyte 33 may be on the reflecting layer 65 and separated by the middle spacer 40b. Materials for the reflecting layer 65 may be the same as the materials for the first reflecting layer 61 and the second reflecting layer 63. Materials for the middle spacer 40b may be the same as the materials for the spacer 40.

Unless mentioned otherwise, the electrochromic device, the lower substrate, the upper substrate, the lower electrode, the upper electrode, the first sub-pixel, the second sub-pixel, and operation principles of the electrochromic device are the same as in the above.

Figure 5:
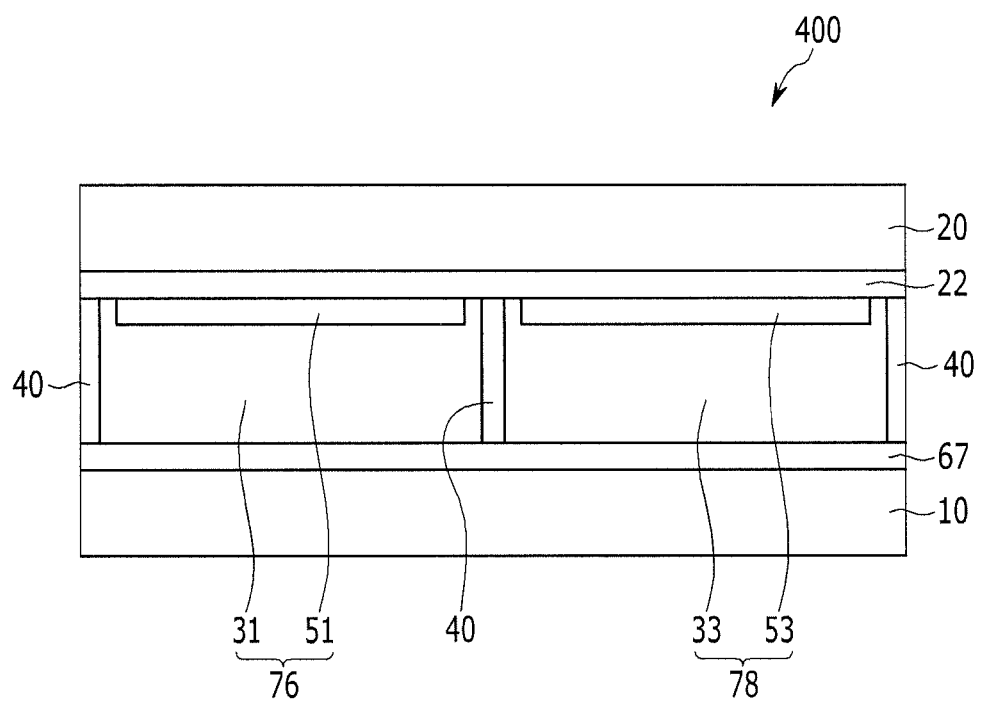
FIG. 5 is a cross-sectional view showing an electrochromic device according to example embodiments.

FIG. 5 is a cross-sectional view showing an electrochromic device according to example embodiments.

Referring to FIG. 5, the electrochromic device 400 according to example embodiments includes: a lower substrate 10 and a upper substrate 20 facing each other and fixed by spacers 40; a reflecting layer 67 and an upper electrode 22 disposed on one surface of the lower substrate 10 and the upper substrate 20, respectively; and a first sub-pixel 76 and a second sub-pixel 78 separated between the reflecting layer 67 and the upper electrode 22 by, for example, at least one spacer 40. A pixel of the electrochromic device 400 may include the first sub-pixel 76 and the second sub-pixel 78.

The first sub-pixel 76 includes the first electrolyte 31 filled between the reflecting layer 67 and the upper electrode 22, and the first electrochromic layer 51 on one surface of the upper electrode 22 and contacting the first electrolyte 31. The second sub-pixel 77 includes the second electrolyte 33 filled between the reflecting layer 67 and the upper electrode 22, and the second electrochromic layer 53 on one surface of the upper electrode 22 and contacting the second electrolyte 33.

The electrochromic device 400 in FIG. 5 may include a reflecting layer 67 common to the first sub-pixel 76 and the second sub-pixel 78. The reflecting layer 67 may be a metal electrode (e.g., an Al electrode) having an embossing structure, but example embodiments are not limited thereto. The first electrolyte 31 and the second electrolyte 33 may be on the reflecting layer 67 and separated by at least one spacer 40. The reflecting layer 67 may function as a lower electrode in the electrochromic device 400.

Unless mentioned otherwise, the electrochromic device, the lower substrate, the upper substrate, the upper electrode, the first sub-pixel, the second sub-pixel, and operation principles of the electrochromic device are the same as in the above.

The following examples describe electrochromic devices according to example embodiments in more detail; however, example embodiments are not limited to the features described in the following examples.

EXAMPLES

Example 1

Fabrication of Electrochromic Device

A glass substrate is prepared, and two separated Ictrodes are provided. A spacer is provided between the two ITO electrodes using an insulating photoresist (SU-8). An electrochromic material represented by Formula 2 is coated on one side of the ITO electrode with reference to the spacer, and an electrochromic material represented by Formula 3 is coated on the other side of the ITO electrode. The electrochromic material is coated according to an Inkjet method. Another glass substrate is prepared, and the separated ITO electrodes are provided thereon to correspond to the separated positions of the prepared ITO electrodes. A $TiO_2$ layer including $TiO_2$ having an average particle diameter of 25 nm is provided on each ITO electrode separated from each other in a thickness of 7 μm. The two glass substrates are disposed facing each other and sealed with spacers and injected with an electrolyte in which 0.1 mol of $LiClO_4$, 0.05 mol of ferrocene, and 0.05 mol of benzoquinone are dissolved in gamma-butyrolactone to provide an electrochromic device.

A pixel coated with the electrochromic material represented by the above Formula 2 is referred to as a first sub-pixel, and a pixel coated with the electrochromic material represented by above Formula 3 is referred to as a second sub-pixel.

[Chemical Formula 2]

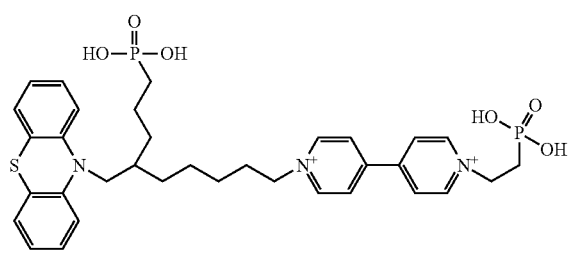

[Chemical Formula 3]

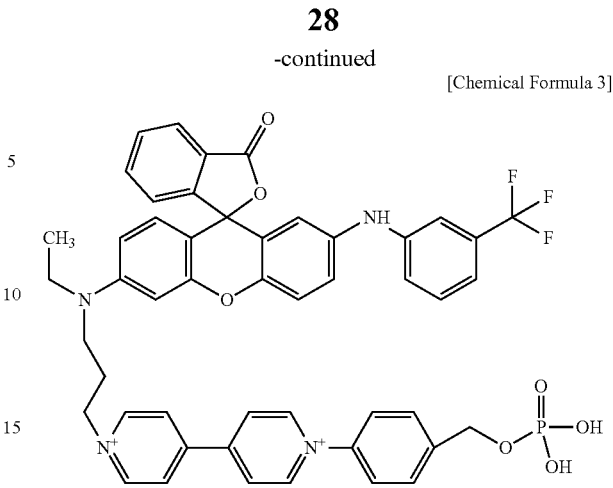

The obtained electrochromic device is sequentially applied with oxidation and reduction voltages to monitor the color display according to the voltage level.

The results are described with reference to FIG. 6 to FIG. 11.

Figure 6:
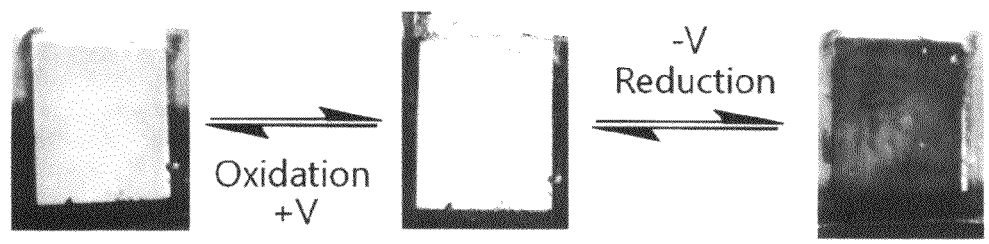
FIG. 6 is a photograph showing color change according to the applied voltage of the first sub-pixel in the electrochromic device according to Example 1.

FIG. 6 is a photograph showing the color change according to the applied voltage of the first sub-pixel in the electrochromic device according to Example 1. For example, FIG. 6 shows the color change in the neutral state of 0 V, the oxidation state of positive (+) 1.6 V, and the reduction state of negative (−) 1.6 V.

Figure 7:
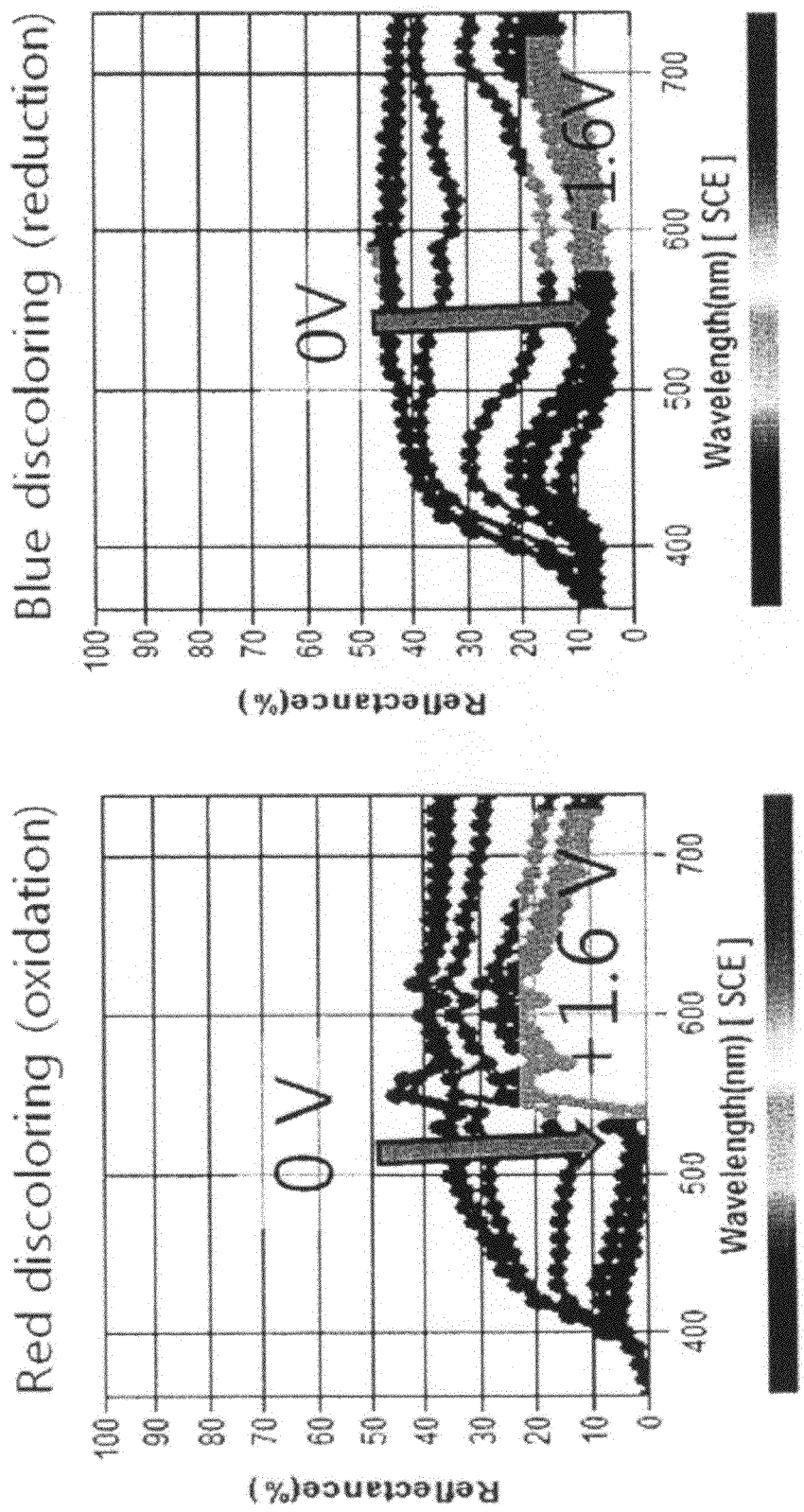
FIG. 7 is a graph showing light reflectance according to the applied voltage of the first sub-pixel in the electrochromic device according to Example 1.

FIG. 7 is a graph showing the light reflectance of the first sub-pixel according to the applied voltage in the electrochromic device according to Example 1.

Figure 8:
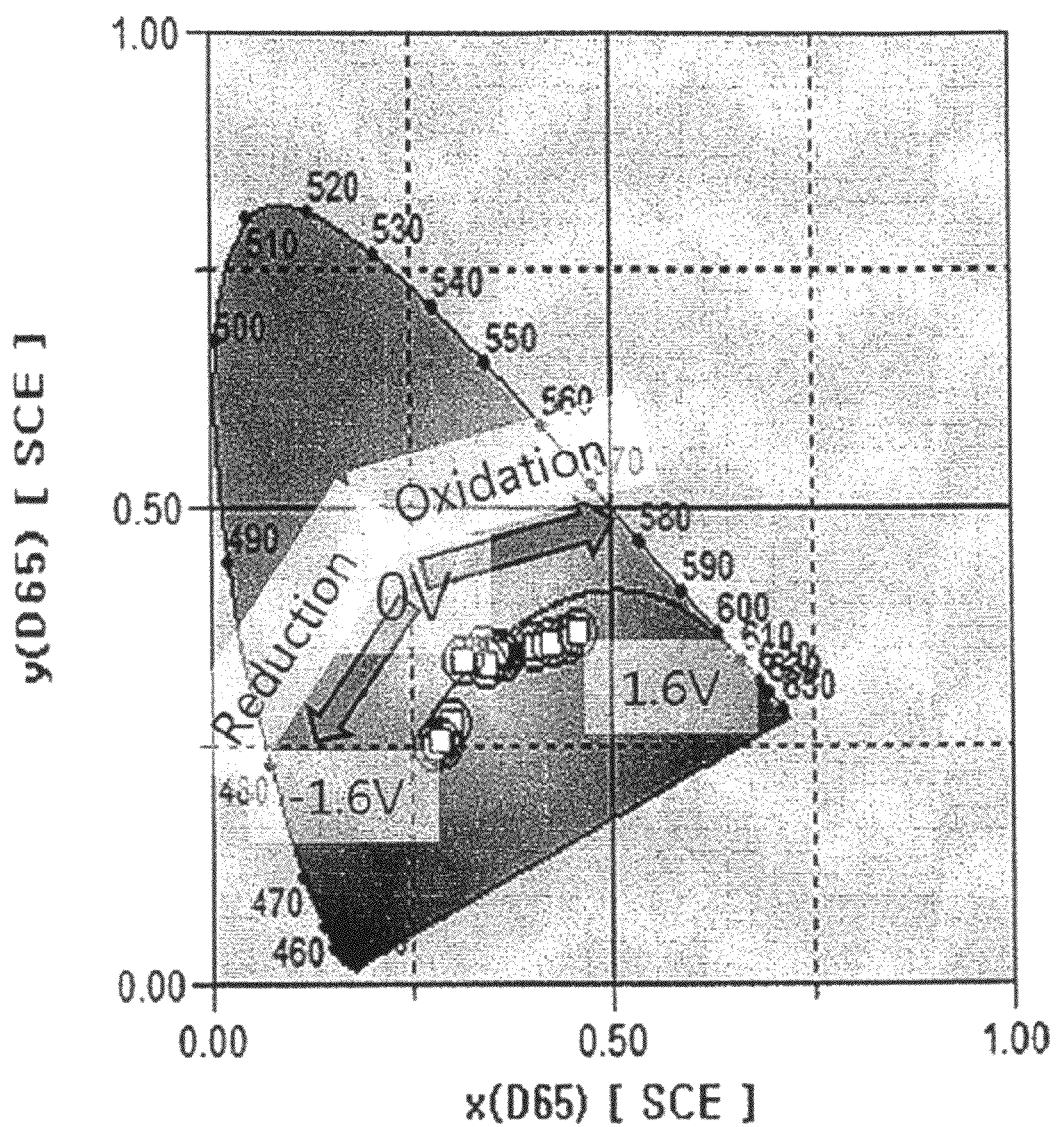
FIG. 8 shows color coordinates that are changed by the applied voltage of the first sub-pixel in the electrochromic device according to Example 1.

FIG. 8 shows color coordinate changes depending upon the applied voltage to the first sub-pixel in the electrochromic device according to Example 1. In FIG. 8, x(D65) [SCE] indicates the x-coordinate of the color coordinates which is SCE (specular component excluded) data measured under the D65 standard illuminant, and y(D65) [SCE] indicates the y-coordinate of the color coordinates which is SCE (specular component excluded) data measured under the D65 standard illuminant.

Referring to FIG. 6, it is confirmed that the first sub-pixel of the electrochromic device according to Example 1 is transparent when not applying a voltage, and displays red in the oxidation state of +1.6 V and displays blue in the reduction state of −1.6 V.

Referring to FIG. 7 and FIG. 8, it is confirmed that in the first sub-pixel of the electrochromic device according to Example 1, the reflectance in the red wavelength range of about 580 nm to 750 nm is higher than the reflectance in the other visible light regions and the red color coordinate is clearer by increasing the applied voltages of 0 V, +1 V, +1.2 V, +1.4 V, and +1.6 V.

In addition, referring to FIG. 7 and FIG. 8, it is confirmed that in the first sub-pixel of the electrochromic device according to Example 1, the reflectance in the blue wavelength range of about 410 nm to 510 nm is higher than the reflectance in the other visible light region and the blue color coordinate is clearer by increasing the applied voltage in a negative way of 0 V, −0.8 V, −1 V, −1.2 V, −1.4 V and −1.6 V.

Figure 9:
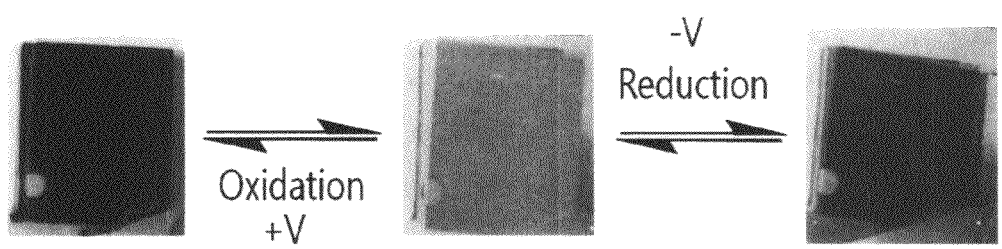
FIG. 9 is a photograph showing the color change depending upon the applied voltage of the second sub-pixel in the electrochromic device according to Example 1.

FIG. 9 is a photograph showing the color change depending upon the voltage applied to the second sub-pixel in the electrochromic device according to Example 1. For example, FIG. 9 shows the color change in the neutral state of 0 V, the oxidation state of +2.6 V, and the reduction state of −1.6 V.

Figure 10:
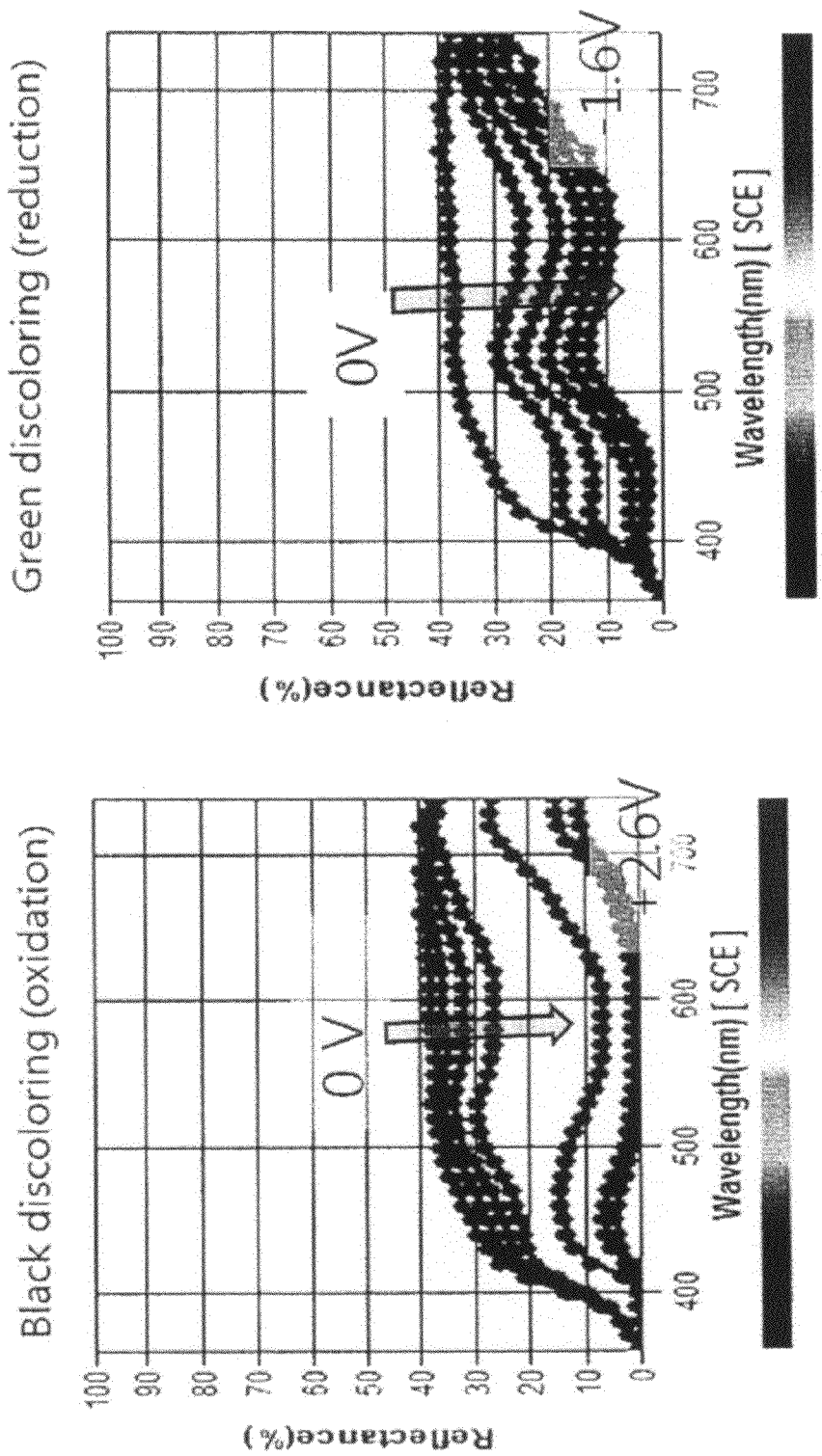
FIG. 10 is a graph showing the light reflectance depending upon the applied voltage of the second sub-pixel in the electrochromic device according to Example 1.
Figure 11:
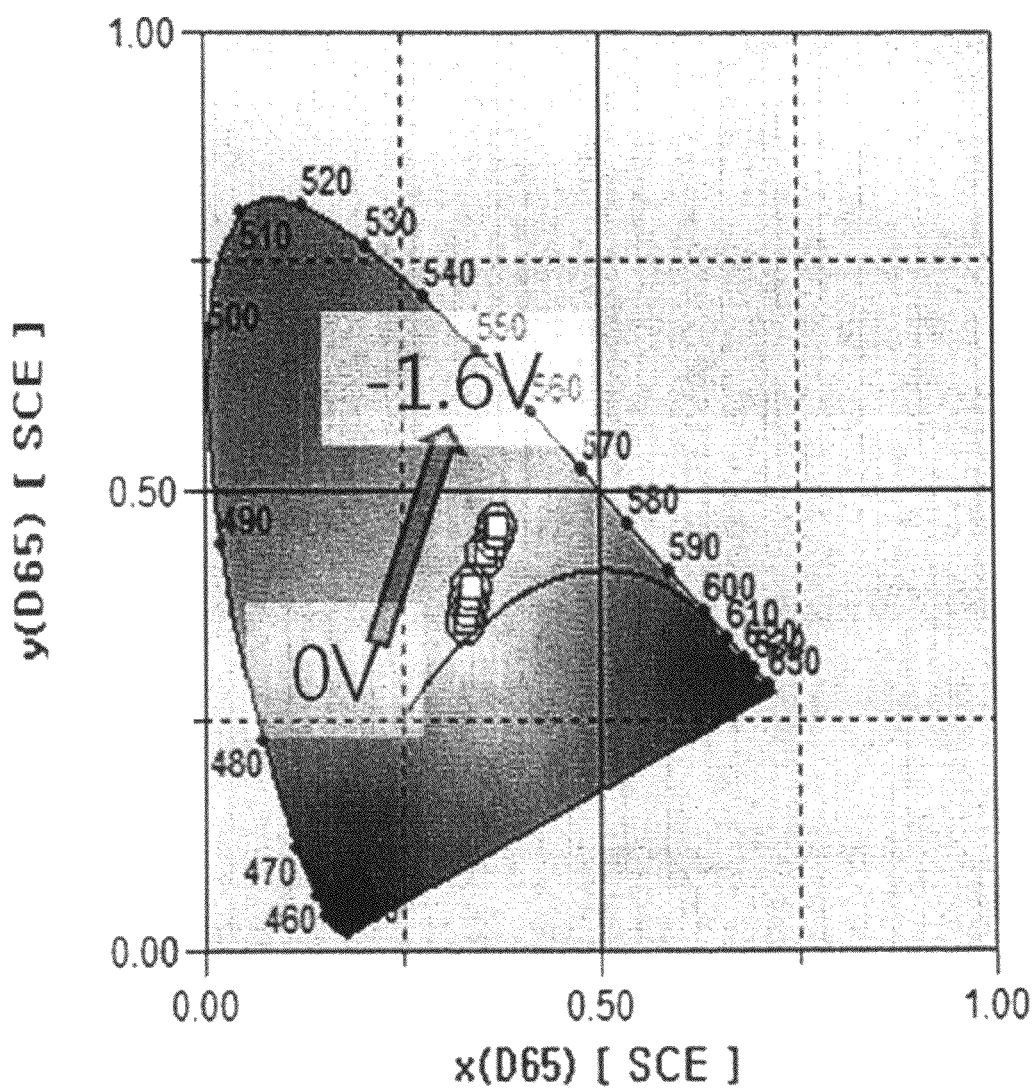
FIG. 11 shows color coordinates that are changed depending upon the applied voltage of the second sub-pixel in the electrochromic device according to Example 1.

FIG. 10 is a graph showing the light reflectance depending upon the voltage applied to the second sub-pixel in the electrochromic device according to Example 1, and FIG. 11 shows the color coordinate changes depending upon the voltage applied to the second sub-pixel in the electrochromic device according to Example 1. In FIG. 9, the definitions of x(D65) [SCE] and y(D65) [SCE] are the same as in FIG. 8.

Referring to FIG. 9, it is confirmed that the second sub-pixel of the electrochromic device according to Example 1 is transparent when applying no voltage, displays black in the oxidation state of +2.6 V, and displays green in the reduction state of −1.6 V.

Referring to FIG. 10, it is confirmed that the second sub-pixel of the electrochromic device according to Example 1 displays black since the reflectance is decreased in all wavelength regions when increasing the applied voltage of 0 V, +1.8 V, +2 V, +2.2 V, +2.4 V, and +2.6 V.

In addition, referring to FIG. 10 and FIG. 11, it is confirmed that in the second sub pixel of the electrochromic device according to Example 1, the reflectance in the green wavelength range of about 500 nm to 600 nm is higher than the reflectance in the other visible light region, and the green color coordinate is clearer by increasing the applied voltage (reduction potential) in negative way of 0V, −0.8 V, −1 V, −1.2 V, −1.4 V, and −1.6 V.

Example 2

Fabrication of Electrochromic Device

An electrochromic device is fabricated according to the same procedure as in Example 1, except that the electrochromic material represented by following Formula 2-1 is coated and then the electrochromic material represented by the following Formula 2-2 is coated instead of the electrochromic material represented by above Formula 2, and the electrochromic material represented by following Formula 3-1 is coated and then the electrochromic material represented by the following Formula 3-2 is coated instead of the electrochromic material represented by above Formula 3.

The pixel obtained by coating the electrochromic material represented by above Formulae 2-1 and 2-2 is referred to a first sub-pixel, and the pixel obtained by coating the electrochromic material represented by above Formulae 3-1 and 3-2 is referred to a second sub-pixel.

[Chemical Formula 2-1]

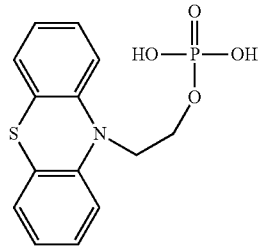

[Chemical Formula 2-2]

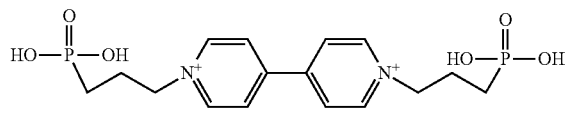

[Chemical Formula 3-1]

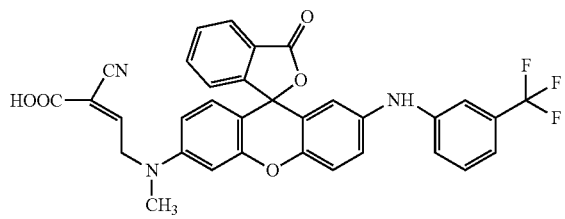

[Chemical Formula 3-2]

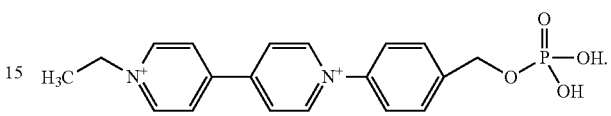

The color display depending upon voltage level is monitored by sequentially applying the oxidation voltage to the obtained electrochromic device, and the color display depending upon voltage level is monitored by sequentially applying the reduction voltage.

As the result, it is confirmed that the first pixel of the electrochromic device according to Example 2 is transparent when not applying a voltage, displays red in the oxidation state of more than 0 V to +1.6 V, and displays blue in the reduction state of −1.6 V to less than 0V.

In addition, it is confirmed that the second pixel of the electrochromic device according to Example 2 is transparent when not applying a voltage, displays black in the oxidation state of more than 0 V to +3 V, and displays green in the reduction state of −1.6 V to less than 0 V.

While some example embodiments have been particularly shown and described, it will be understood by one of ordinary skill in the art that variations in form and detail may be made therein without departing from the spirit and scope of the claims.

What is claimed is:
1. An electrochromic device comprising:
a pixel including a first sub-pixel and a second sub-pixel;
the first sub-pixel comprising,
a first electrolyte contacting a first electrochromic layer,
the first electrochromic layer including a first electrochromic material configured to display each one of transparency and at least two colors, based on a voltage applied to the first electrochromic material, and
the second sub-pixel comprising,
a second electrolyte contacting a second electrochromic layer,
the second electrochromic layer including a second electrochromic material configured to display each one of transparency, black, and at least one color other than black, based on a voltage applied to the second electrochromic material.
2. The electrochromic device of claim 1, further comprising:
a first electrode on one surface of the first sub-pixel;
a first terminal on another surface of the first sub-pixel;
a second electrode on one surface of the second sub-pixel; and
a second terminal on another surface of the second sub-pixel.

3. The electrochromic device of claim 2, wherein
the device is configured to apply equal or different voltages to the first electrode and the second electrode, and
the device is configured to apply equal or different voltages to the first terminal and the second terminal.

4. The electrochromic device of claim 1, wherein
the first electrochromic material and the second electrochromic material are different from each other, and
the first electrochromic material and the second electrochromic material each independently include one of an n type material, a p type material, and a combination thereof.

5. The electrochromic device of claim 4, wherein the first electrochromic material and the second electrochromic material each independently include one of:
an n type material including at least one of an n type metal oxide, a viologen-based compound, a phthalate-based compound, a pyridine-based compound, an anthraquinone-based compound, a cathodic discoloring conductive polymer compound, and a combination thereof,
a p type material including at least one of a p type metal oxide, a phenyl amine-based compound, an aminoquinone-based compound, a rare earth element-based organic compound, a phthalocyanine-based compound, a phenothiazine-based compound, a phenoxathiine-based compound, a dibenzodioxin-based compound, a dye-based compound, an anodic discoloring conductive polymer compound, and a combination thereof, and
a combination thereof.

6. The electrochromic device of claim 1, wherein
the first electrochromic layer and the second electrochromic layer are separated from each other so the first electrochromic and the second electrochromic layers are configured to independently display colors of the first electrochromic and the second electrochromic materials respectively.

7. The electrochromic device of claim 1, wherein
the first electrochromic material displays transparency when the voltage applied to the first electrochromic material equals a first voltage,
the first electrochromic material displays one of the at least two colors when the voltage applied to the first electrochromic material equals one of a second voltage and a third voltage,
the first electrochromic material display another of the at least two colors when the voltage applied to the first electrochromic materials equals the other of the second voltage and the third voltage,
wherein the first voltage, the second voltage, and the third voltage are different from each other.

8. The electrochromic device of claim 7, wherein
the second electrochromic material displays transparency when the voltage applied to the second electrochromic material equals the first voltage, and
the second electrochromic material displays black when the voltage applied to the second electrochromic materials equals one of the second voltage and the third voltage, and
the second electrochromic material displays one of the at least one color other than black when the voltage applied to the second electrochromic material equals the other of the second voltage and the third voltage.

9. The electrochromic device of claim 8, wherein
the first electrochromic material and the second electrochromic material display different colors when,
the voltage applied to the first electrochromic material equals the second voltage, and
the voltage applied to the second electrochromic material equals the second voltage.

10. The electrochromic device of claim 8, wherein
the first electrochromic material and the second electrochromic material display different colors when,
the voltage applied to the first electrochromic material equals the third voltage, and
the voltage applied to the second electrochromic material equals the third voltage.

11. The electrochromic device of claim 8, wherein
the first electrochromic material displays at least one of red, green, and blue, respectively when the voltage applied to the first electrochromic material equals at least one of the second voltage and the third voltage; and
the second electrochromic material displays at least one of red, green, blue, and black, respectively when the voltage applied to the second electrochromic material equals at least one of the second voltage and the third voltage.

12. The electrochromic device of claim 8, wherein
the first electrochromic material displays at least one of cyan, magenta, and yellow, respectively, when the voltage applied to the first electrochromic layer equals at least one of the second voltage and the third voltage; and
the second electrochromic material displays at least one of cyan, magenta, yellow, and black, respectively, when the voltage applied o the second electrochromic layer equals at least one of the second voltage and the third voltage.

13. The electrochromic device of claim 8, wherein
the first electrochromic material displays at least one of cyan, magenta, and yellow, respectively, when the voltage applied to the first electrochromic material equals at least one of the second voltage and the third voltage; and
the second electrochromic material displays at least one of red, green, blue, and black, respectively, when the voltage applied to the second electrochromic material equals at least one of the second voltage and the third voltage.

14. The electrochromic device of claim 8, wherein
the first electrochromic material displays at least one of red, green, and blue, respectively, when the voltage applied to the first electrochromic material equals at least one of the second voltage and the third voltage; and
the second electrochromic material displays at least one of cyan, magenta, yellow, and black, respectively, when the voltage applied to the second electrochromic material equals at least one of the second voltage and the third voltage.

15. The electrochromic device of claim 1, wherein
the first sub-pixel and the second sub-pixel display transparency when the voltage applied to the first electrochromic material and the voltage applied to the second electrochromic material equal a first voltage,
the first sub-pixel displays at least one of the at least two colors and the second sub-pixel displays at least one of black and the at least one color other than black, when the voltage applied to the first electrochromic material and the voltage applied to the second electrochromic material equals at least one of a second voltage and a third voltage,
the color displayed by the first sub-pixel and the color displayed by the second sub-pixel are different from each other when the voltage applied to the first electrochromic material and the voltage applied to the second electrochromic material equals the second voltage, and
the color displayed by the first sub-pixel and the color displayed by the second sub-pixel are different from each other when the voltage applied to the first electrochromic material and the voltage applied to the second electrochromic material equals the third voltage.

16. The electrochromic device of claim 1, wherein
the first electrolyte comprises an opposing type of material to the first electrochromic material, and
the second electrolyte comprises an opposing type of material to the second electrochromic material.

17. The electrochromic device of claim 1, further comprising:
at least one spacer separating the first sub-pixel and the second sub-pixel.

18. The electrochromic device of claim 1, wherein
the first sub-pixel further comprises a first reflecting layer, and
the first reflecting layer faces the first electrochromic layer across the first electrolyte.

19. The electrochromic device of claim 1, wherein
the second sub-pixel further comprises a second reflecting layer, and the second reflecting layer faces the second electrochromic layer across the second electrolyte.

20. The electrochromic device of claim 1, further comprising:
a plurality of the pixels.

21. The electrochromic device of claim 1, further comprising:
at least one pair of electrodes on a substrate, wherein
the pixel is between the at least one pair of electrodes.

22. The electrochromic device of claim 21, wherein
the pixel includes at least one spacer separating the first sub-pixel and the second sub-pixel, and
the first sub-pixel and the second sub-pixel are between one pair of the at least one pair of electrodes.

23. The electrochromic device of claim 22, wherein the one pair of the least one pair of electrodes includes a non-transparent electrode.

24. The electrochromic device of claim 23, wherein
the non-transparent electrode includes a reflecting layer, and
at least one of the first electrolyte and the second electrolyte is on the reflecting layer.

25. The electrochromic device of claim 22, further comprising:
at least one reflecting layer,
wherein the at least one reflecting layer is on one electrode of the one pair of the at least one pair of electrodes.

26. The electrochromic device of claim 21, further comprising:
a controller configured to apply equal or different voltages to the first sub-pixel and the second sub-pixel through the at least one pair of electrodes.

27. The electrochromic device of claim 21, wherein
the pixel is connected to two pairs of electrodes,
the first sub-pixel is between one pair of the two pairs of electrodes, and
the second sub-pixel is between the other pair of the two pairs of electrodes.

28. The electrochromic device of claim 21, wherein the substrate includes one of glass and transparent polymer.

29. The electrochromic device of claim 28, wherein the substrate is a transparent polymer including at least one of polyacrylate, polyethylene ether phthalate, polyethylene naphthalate, polycarbonate, polyarylate, polyetherimide, polyethersulfone, polyethylene terephthalate, and polyimide.

30. A pixel structure comprising:
a lower electrode layer;
a first sub-pixel connected to the lower electrode layer, the first sub-pixel including,
a first electrolyte contacting a first electrochromic layer,
the first electrochromic layer including a first electrochromic material configured to display each one of transparency and at least two colors, based on a voltage applied to the first electrochromic material, and
a second sub-pixel connected to the lower electrode layer, the second sub-pixel including,
a second electrolyte contacting a second electrochromic layer,
the second electrochromic layer including a second electrochromic material configured to display each one of transparency, black, and at least one color other than black, based on a voltage applied to the second electrochromic material; and
an upper electrode layer on the first sub-pixel and the second sub-pixel.

31. An electrochromic device comprising:
a plurality of the pixel structures of claim 30.

32. An electronic device comprising:
the electrochromic device of claim 31,
wherein the electronic device includes one of a smart window, a display device, and a transparent display device.

33. An electrochromic device comprising:
a pixel structure connected to at least one pair of electrodes, the pixel structure including,
a first sub-pixel containing a first electrochromic layer on a first electrolyte,
the first electrochromic layer configured to display at least one of transparency and at least two colors, depending on a voltage applied to the first sub-pixel,
a second sub-pixel containing a second electrochromic layer on a second electrolyte,
the second electrochromic layer configured to display at least one of transparency, black, and at least one color other than black, depending on a voltage applied to the second sub-pixel.

34. The electrochromic device of claim 33, wherein
the first electrochromic layer includes at least one different material than the second electrochromic layer, and
the first electrochromic layer and the second electrochromic layer each independently include one of an n type material, a p type material, and a combination thereof.

35. The electrochromic device of claim 34, wherein the first electrochromic layer and the second electrochromic layer each independently include one of:
an n type material including at least one of an n type metal oxide, a viologen-based compound, a phthalate-based compound, a pyridine-based compound, an anthraquinone-based compound, a cathodic discoloring conductive polymer compound, and a combination thereof,
a p type material including at least one of a p type metal oxide, a phenyl amine-based compound, an aminoquinone-based compound, a rare earth element-based organic compound, a phthalocyanine-based compound, a phenothiazine-based compound, a phenoxathiine-based compound, a dibenzodioxin-based compound, a dye-based compound, an anodic discoloring conductive polymer compound, and a combination thereof, and
a combination thereof.

36. The electrochromic device of claim 33, wherein
the first electrochromic layer includes a first electrochromic material represented by one of the following Chemical Formulae 1 to 2:

[Chemical Formula 1]
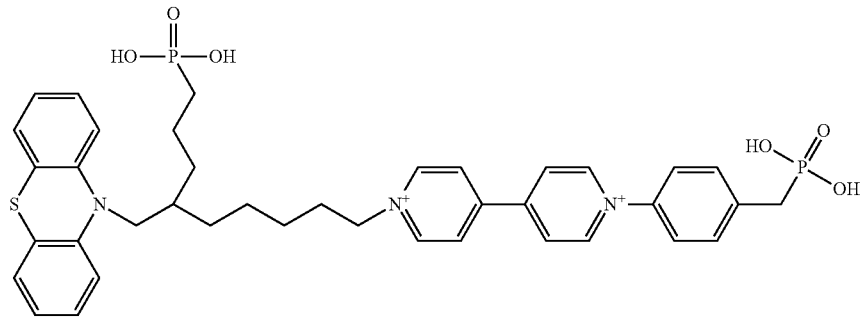
[Chemical Formula 2]
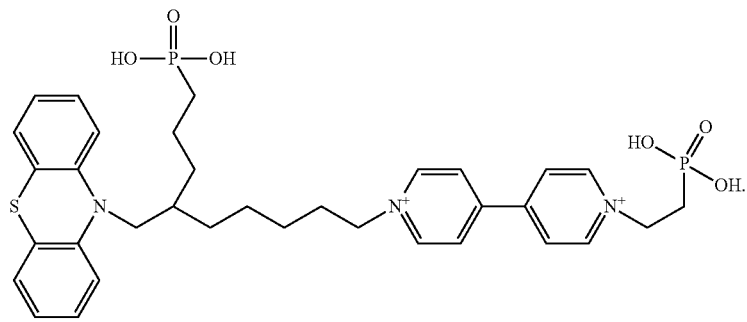
37. The electrochromic device of claim 36, wherein the second electrochromic layer includes a second electrochromic material represented by one of the following Chemical Formulae 3 to 4:
[Chemical Formula 3]
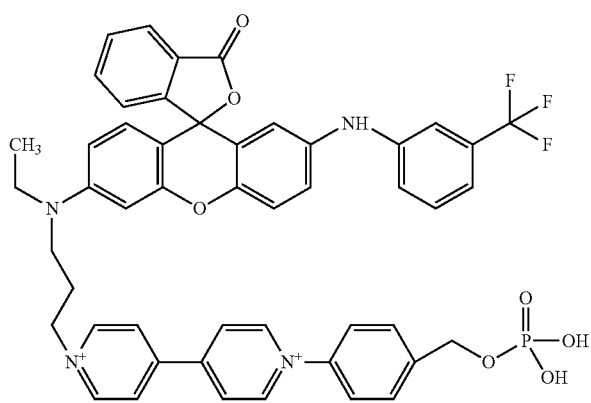

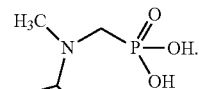
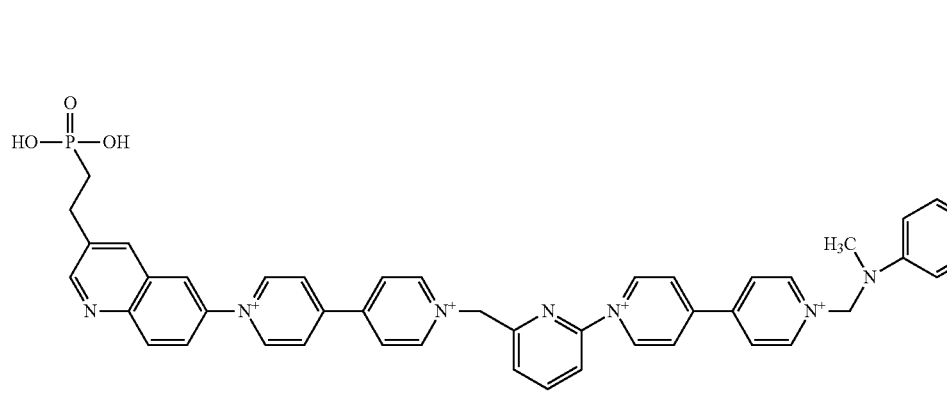
38. The electrochromic device of claim 33, wherein the second electrochromic layer includes a second electrochromic material represented by one of the following Chemical Formulae 3 to 4:
[Chemical Formula 3]
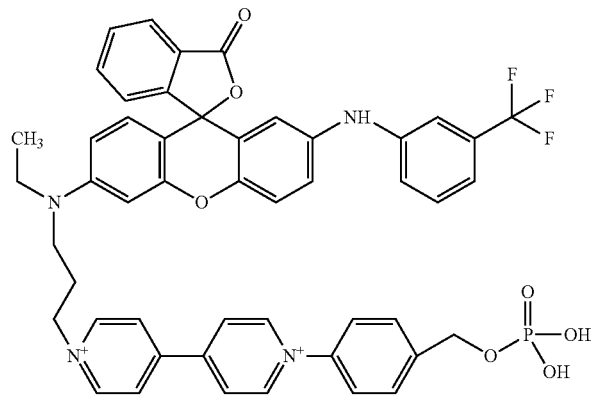
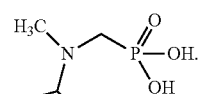
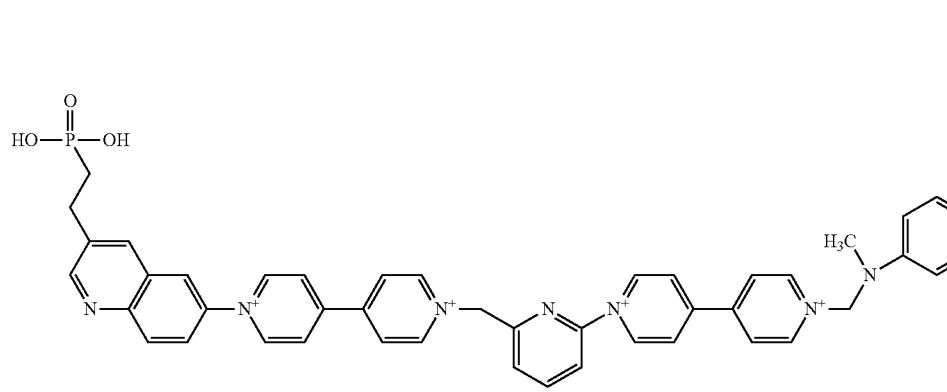

39. The electrochromic device of claim 33, wherein the first electrochromic layer includes a pair of electrochromic materials represented by one of:
the following pair of Chemical Formulae 1-1 and 1-2,

[Chemical Formula 1-1]

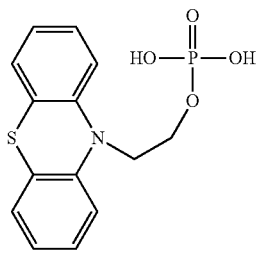

[Chemical Formula 1-2]

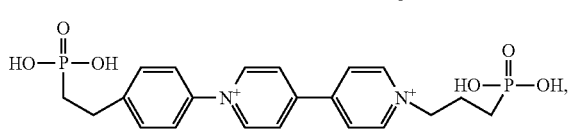

and
the following pair of Chemical Formulae 2-1 and 2-2,

[Chemical Formula 2-1]

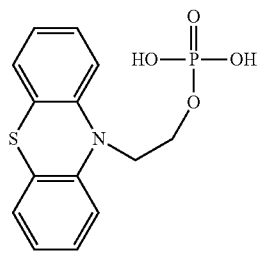

[Chemical Formula 2-2]

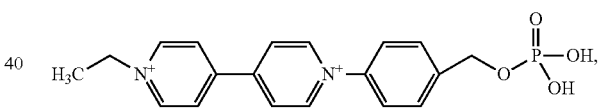

40. The electrochromic device of claim 39, wherein the second electrochromic layer includes a pair of electrochromic materials represented by one of
the following pair of Chemical Formulae 3-1 and 3-2,

[Chemical Formula 3-1]

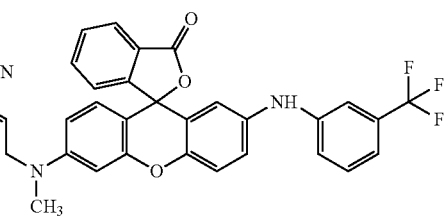

[Chemical Formula 3-2]

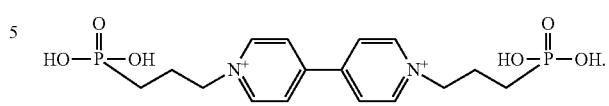

and
the following pair of Chemical Formulae 4-1 and 4-2,

[Chemical Formula 4-1]

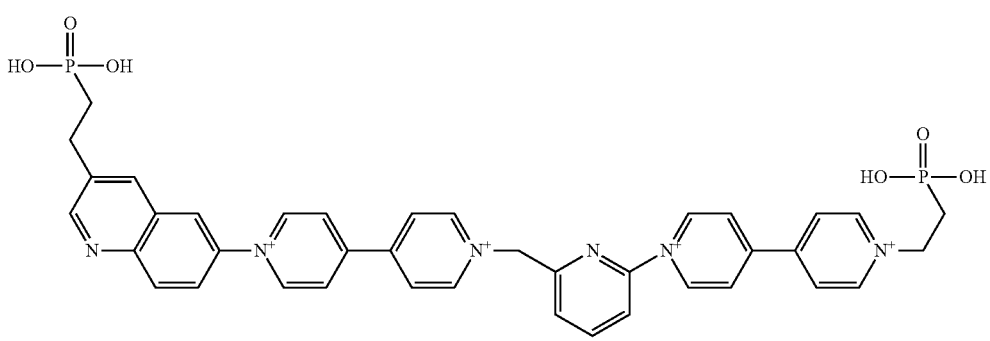

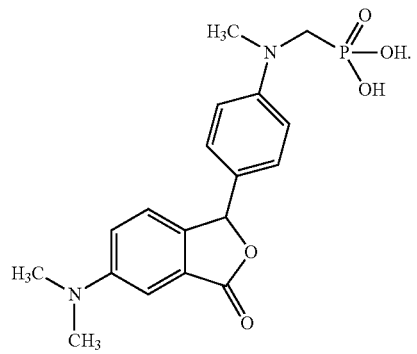
41. The electrochromic device of claim 33, wherein the second electrochromic layer includes a pair of electrochromic materials represented by one of the following pair of Chemical Formulae 3-1 and 3-2,
[Chemical Formula 3-1]
[Chemical Formula 3-2]
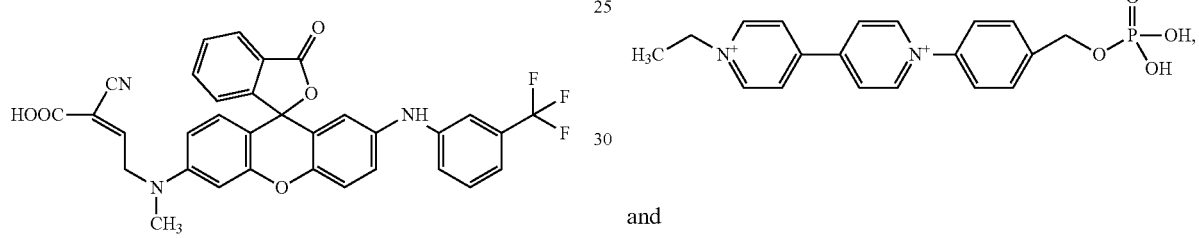
and
the following pair of Chemical Formulae 4-1 and 4-2,
[Chemical Formula 4-1]
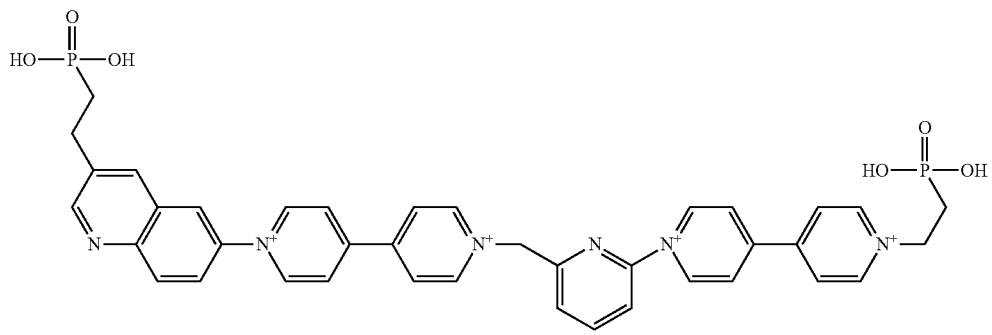
[Chemical Formula 4-2]
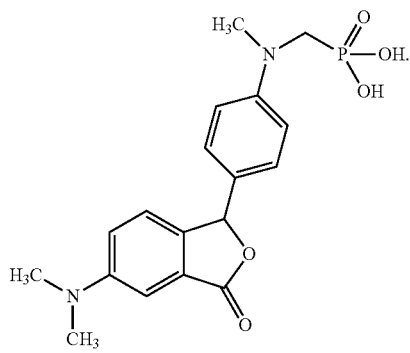
* * * * *